OR 3,760,260

United States Patent
Schuster

[11] 3,760,260
[45] Sept. 18, 1973

[54] METHOD AND APPARATUS FOR INVESTIGATING EARTH FORMATIONS BY EMITTING SURVEY AND AUXILIARY CURRENTS FROM THE SAME ELECTRODE

[75] Inventor: Nick A. Schuster, Darien, Conn.

[73] Assignee: Schlumberger Technology Corporation, New York, N.Y.

[22] Filed: Apr. 24, 1972

[21] Appl. No.: 247,076

Related U.S. Application Data

[63] Continuation of Ser. No. 815,265, April 7, 1969, abandoned.

[52] U.S. Cl. .................................................. 324/10
[51] Int. Cl. ................................................ G01v 3/18
[58] Field of Search ................................... 324/1, 10

[56] References Cited
UNITED STATES PATENTS

| 2,712,631 | 7/1955 | Ferre | 324/10 X |
| 2,806,201 | 9/1957 | Schuster | 324/10 X |
| 2,872,637 | 2/1959 | Blanchard | 324/1 |
| 2,880,389 | 3/1959 | Ferre et al. | 324/1 |
| 3,262,050 | 7/1966 | Threadgold et al. | 324/10 |
| 3,452,269 | 6/1969 | Welz | 324/10 |

Primary Examiner—Gerard R. Strecker
Attorney—Michael J. Berger

[57] ABSTRACT

In accordance with illustrative embodiments of the present invention, an electrode array is utilized for investigating earth formations surrounding a mud filled borehole without undue influence from a conductive mud column. One manner of accomplishing this is to establish a potential distribution in the borehole as if the mud column were of the same resistivity as the formation. Alternatively, a zero potential gradient can be established at various regions in the mud column to effectively block current flow up or down the mud column.

34 Claims, 17 Drawing Figures

Patented Sept. 18, 1973

Nick A. Schuster
INVENTOR.

BY Edward M. Roney

ATTORNEY

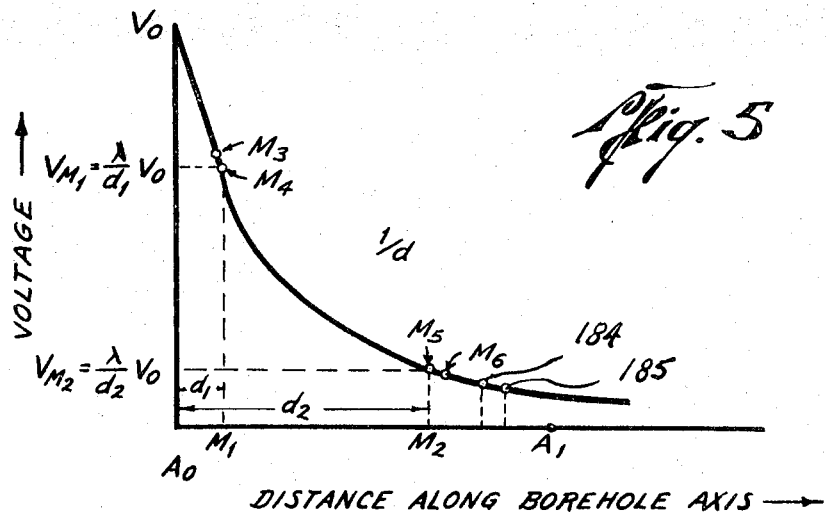
Fig. 5
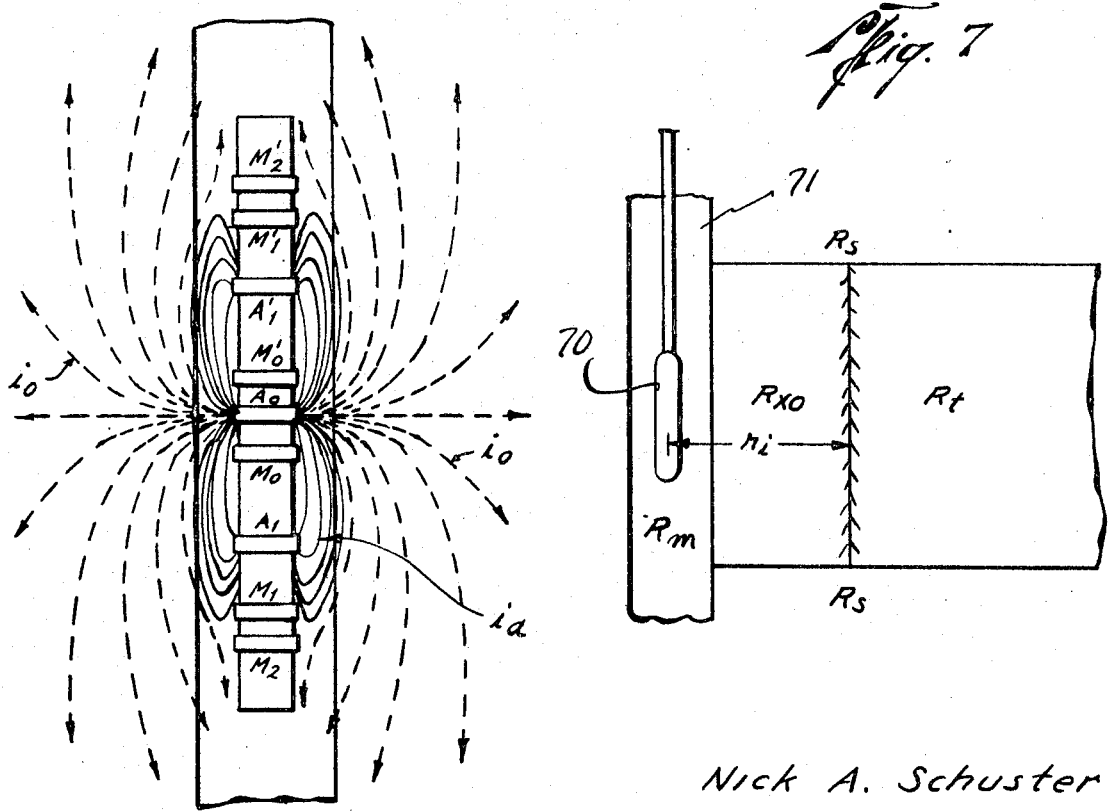
Fig. 9
Fig. 7
Nick A. Schuster
INVENTOR.
BY Edward M. Roney
ATTORNEY

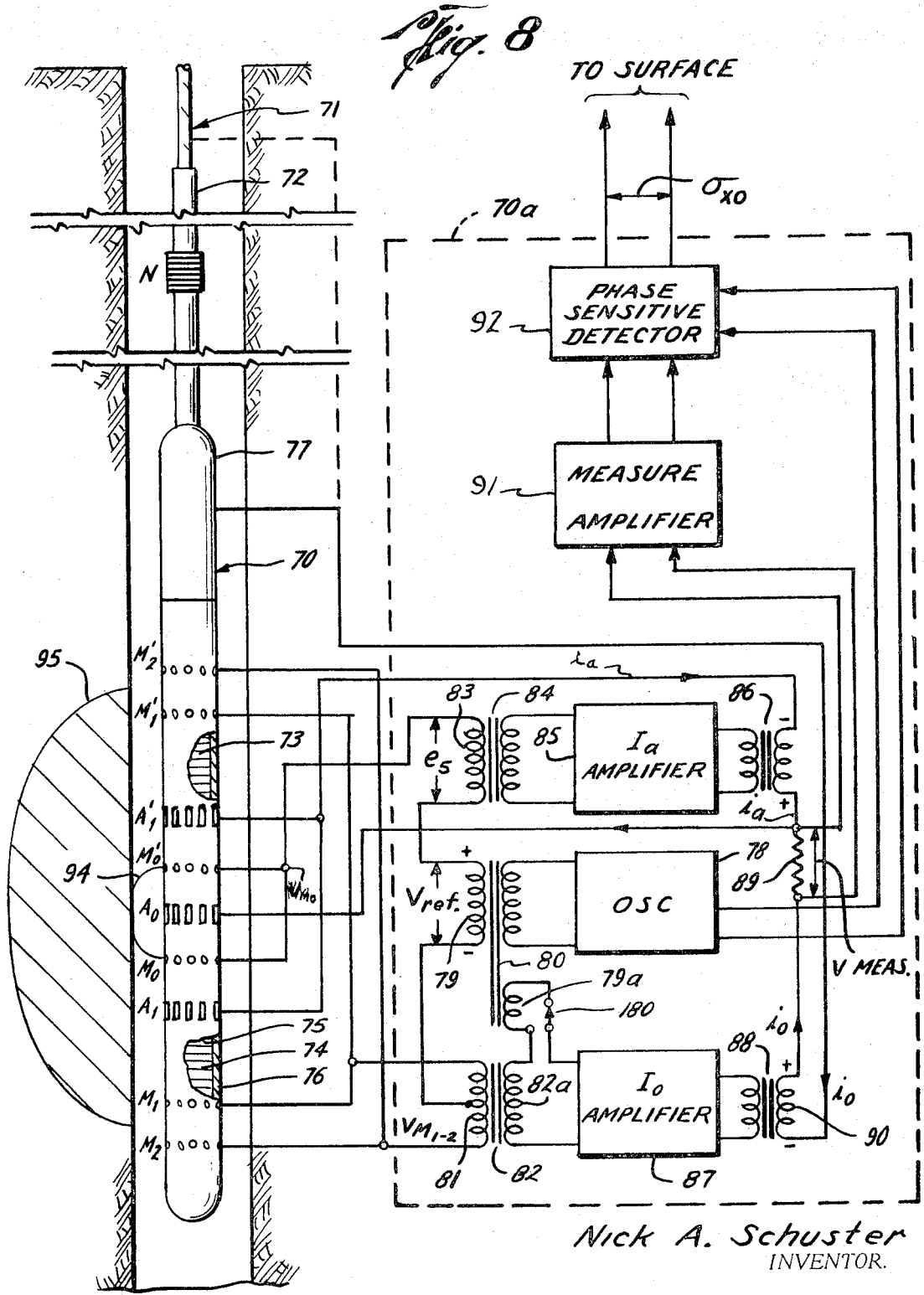

Nick A. Schuster
INVENTOR.

BY Edward M. Rorey
ATTORNEY

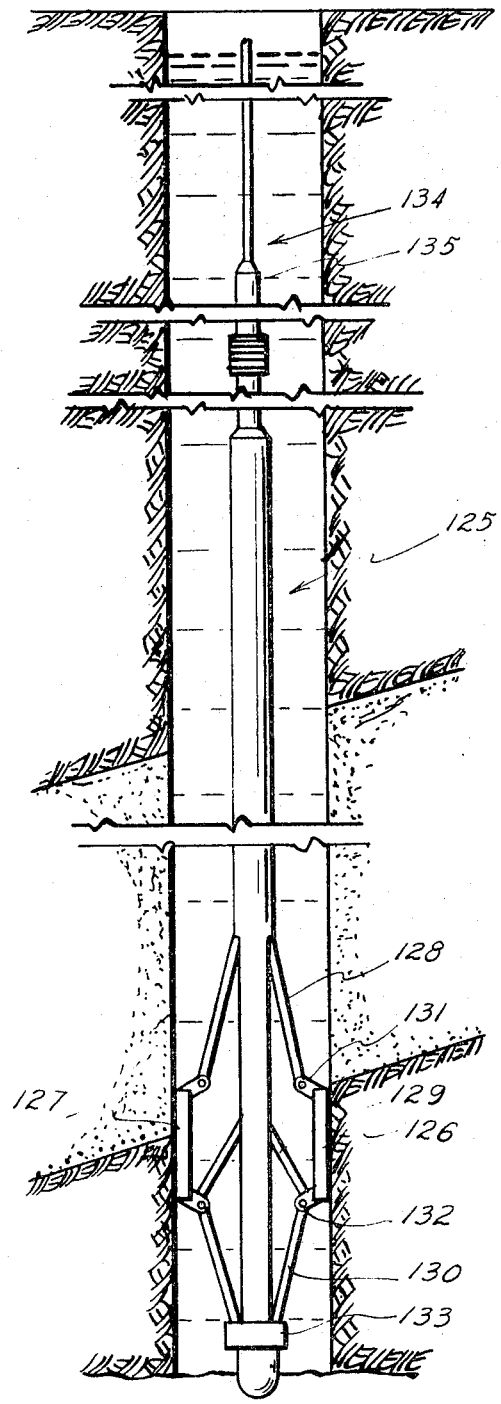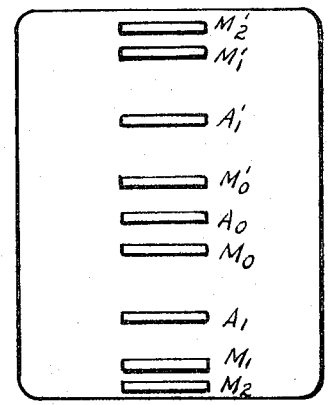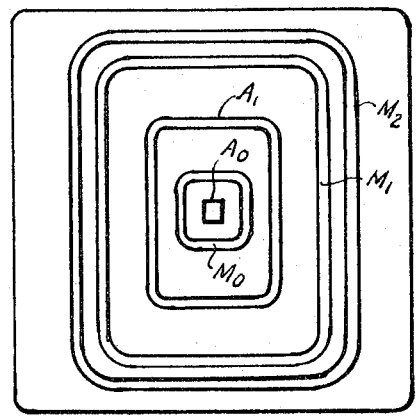
Nick A. Schuster
INVENTOR.
BY Edward M. Roney
ATTORNEY Patented Sept. 18, 1973

Nick A. Schuster
INVENTOR.

BY Edward M. Roney

ATTORNEY

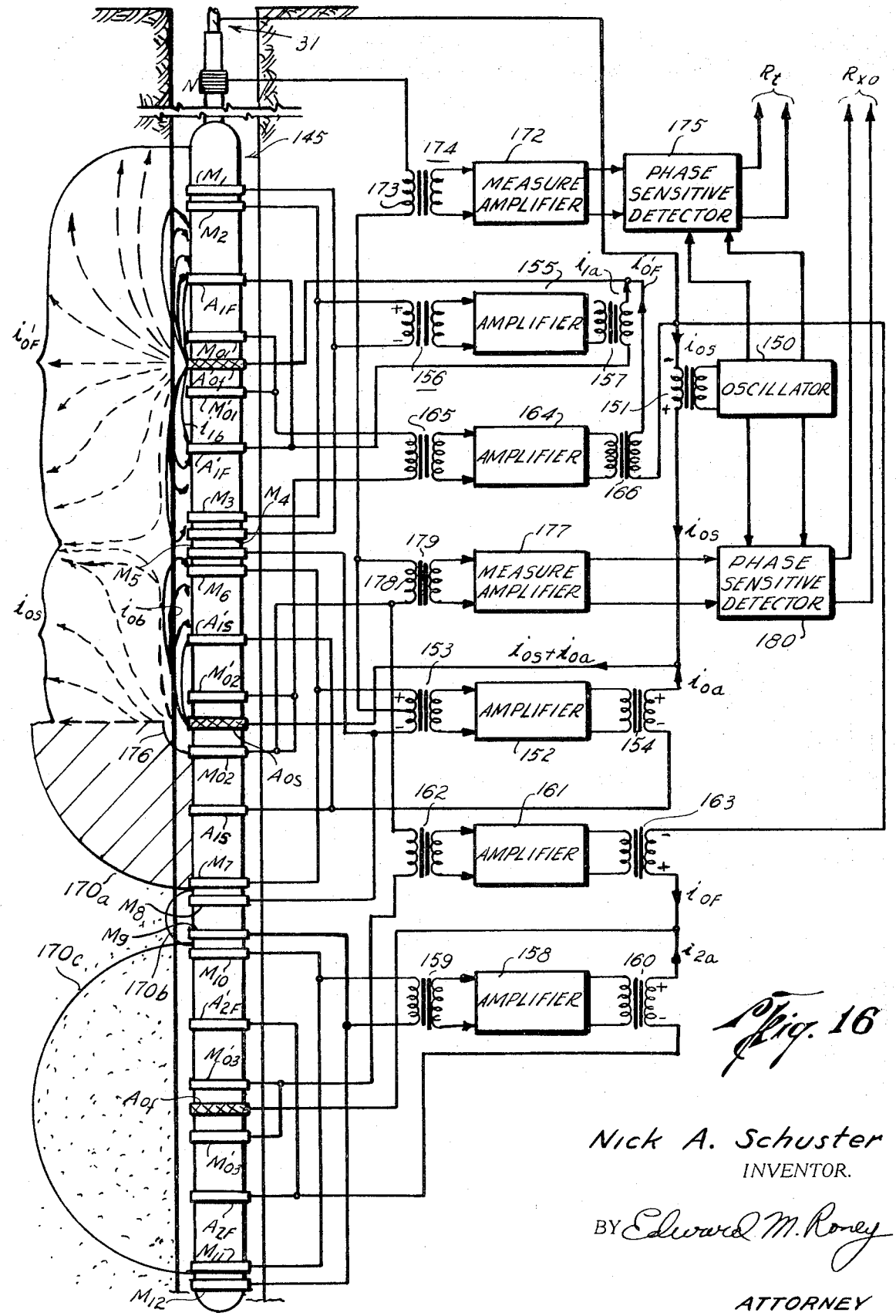

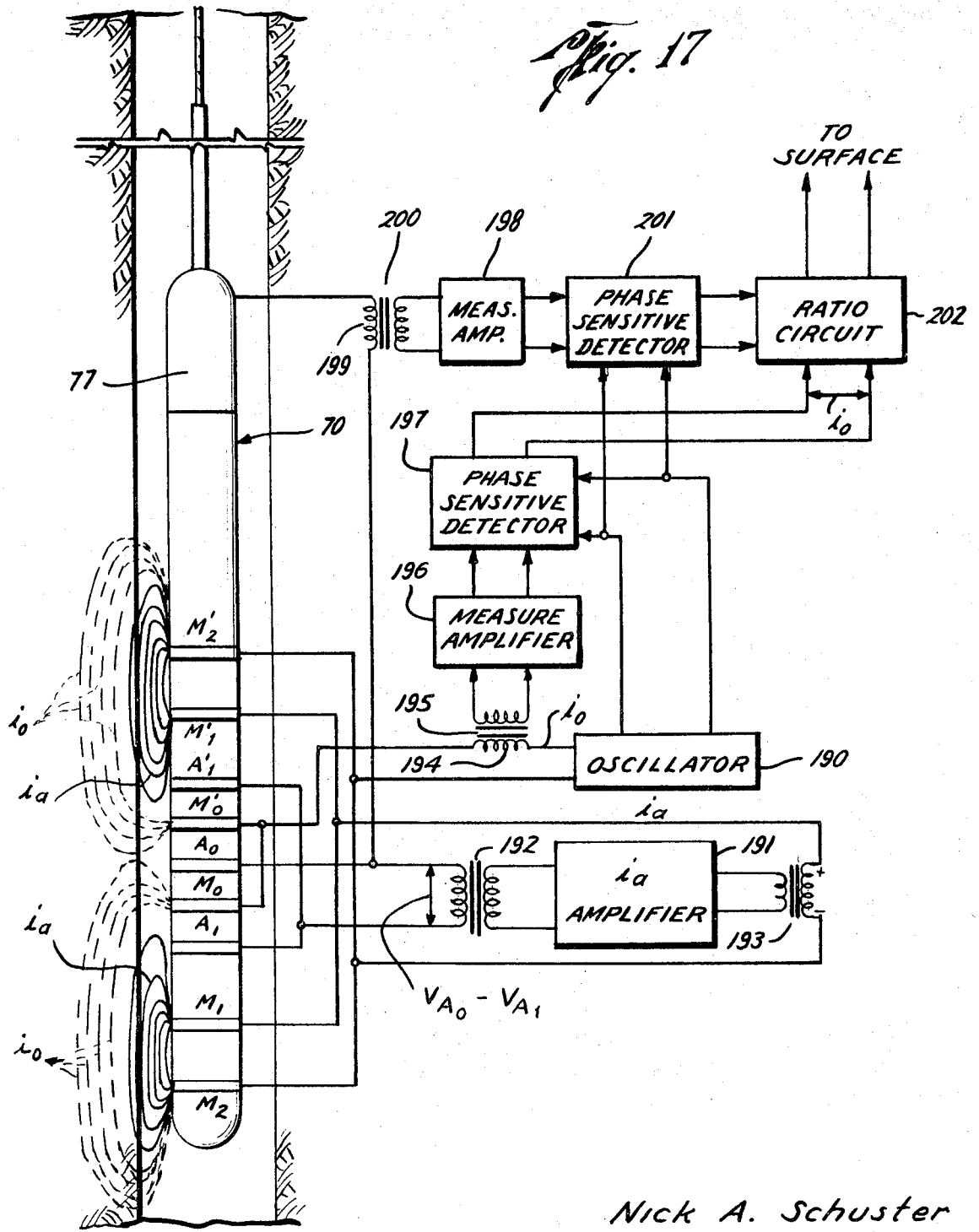

METHOD AND APPARATUS FOR INVESTIGATING EARTH FORMATIONS BY EMITTING SURVEY AND AUXILIARY CURRENTS FROM THE SAME ELECTRODE

This is a continuation of application Ser. No. 815,265, filed Apr. 7, 1969, now abandoned.

This invention relates to methods and apparatus for investigating earth formations traversed by a borehole and more particularly to investigation of earth formations by so-called "electrode" type investigating devices.

It is common practice to investigate earth formations traversed by a borehole with electrode type investigating devices to obtain a log of the electrical resistivity or conductivity of the formations versus depth. One form of such an investigating device emits unfocused current from one electrode and records variations in the potential difference between two other potential measuring electrodes. These potential measuring electrodes can both be located near the current-emitting electrode, both located at a relatively great distance therefrom, or one measuring electrode located near the current-emitting electrode and one remotely located therefrom. The entire electrode array is continuously movable through a bore-hole so that variations in the measured potential difference can be recorded as a function of depth to provide indications of the resistivity or conductivity of the formations which formations include the rock matrix and formation fluids. Examples of such investigating devices are shown in U.S. Pat. No. 1,894,328 granted to C. Schlumberger on Jan. 17, 1933.

There are problems however which may arise when using the above-described electrode type exploring devices under certain borehole conditions. One such problem occurs when the mud fluid filling the borehole, i.e., the mud column, is much more conductive than the adjacent formations. In this event, the current emitted from the principal current-emitting electrode will tend to flow primarily within the fluid in the borehole rather than within the formations. Thus, the potential measuring electrodes would, in this case, tend to be influenced more by the conductivity of the mud column that that of the formations, thus introducing errors into the measurements.

Another class of electrode type logging devices acts to focus a beam of so-called "survey current" into the formations for the purpose of, among other things, eliminating this borehole or mud column effect. In this class of exploring devices, a pair of focusing electrodes is located on either side of a central survey current electrode. Current is emitted from all three electrodes, the current emitted from both focusing electrodes being in-phase with the survey current emitted from the survey electrode so as to focus the survey current into a thin current beam which extends deeply into the formations. Typical examples of such "focused" electrode investigating devices are disclosed in U.S. Pat. Nos. 2,712,627 granted to H. G. Doll on July 5, 1955 and 3,031,612 granted to M. F. Easterling on Apr. 24, 1962. However, as is typical with these focused electrode exploring devices, the radial investigation (i.e., the investigation in a direction perpendicular to the borehole axis) tends to be relatively deep.

While both the focused and nonfocused exploring devices have heretofore provided good results, it would be desirable to have an additional electrode type exploring device which has a relatively shallow depth of investigation, like the nonfocused exploring devices, but yet is not undesirably influenced by a conductive mud column.

Also, it is often desirable to obtain a measure of the resistivity in formation zones at different radii with respect to the borehole axis and to do so with only one run through the borehole. One such tool for accomplishing this is the combination "induction logging" and "focused electrode" tool disclosed in U.S. Pat. No. 3,329,889 granted to D. R. Tanguy on July 4, 1967 which shows both coils and electrodes mounted on the same mandrel. While the radial depth of investigation of the focused electrode tool shown in the Tanguy patent is relatively shallow, it is known that an even shallower depth of investigation can be obtained with exploring devices which have most of the electrodes mounted on a borehole wall-engaging pad member. An example of this type of exploring device is disclosed in U.S. Pat. No. 3,379,965 granted to D. R. Tanguy et al. on Apr. 23, 1968. However, it is difficult to utilize such a wall-engaging pad member simultaneously with an induction logging device because of the adverse effect that the metal portion of the pad and connecting arms have on the induction logging device.

Thus, it is an object of the present invention to provide an electrode type exploring device which is compatible with an induction logging device, yet has a radial depth of investigation comparable with a pad mounted exploring device. Along the same lines, it is another object of this invention to provide an electrode type exploring device that provides both shallow and deep radial investigation at the same time.

While the focused electrode type investigating devices discussed above are much less sensitive to a relatively conductive mud column than the nonfocused electrode type devices, if the mud column is substantially more conductive than the formation under investigation, the potential distribution produced by such a focusd electrode device will tend to be altered from the desired distribution thus giving rise to a possibility for error. In this connection, it is another object of the present invention to provide a focused electrode device of the type described above which would not be unduly affected by a highly conductive mud column.

It is a further object of the present invention to provide new and improved methods and apparatus for use with electrode type exploring devices which substantially minimizes the effect of a conductive mud column on the measurement of resistivity or conductivity.

In accordance with the present invention, a method for investigating earth formations penetrated by a borehole comprises moving a support means carrying a plurality of electrodes through a fluid-filled borehole. Survey and auxiliary currents are supplied to at least one of the electrodes for emission into a media surrounding the support means, the emitted currents returning to at least one current return electrode. The potential distribution in at least a portion of a borehole is measured and at least one of the survey or auxiliary currents is adjusted to maintain a desired potential distribution in said portion of the borehole. By so doing, the survey current will tend to be forced into a formation to enable a measure of a formation characteristic to be obtained.

In one form of the invention, one of the currents is adjusted to give a potential distribution through a borehole which decreases as an inverse function of distance. This can be accomplished by controlling either the potential or potential gradient at two or more points in a borehole.

In another form of the invention, the potential distribution at only one location in a borehole is controlled. In a desirable manner, this control takes the form of maintaining the difference in potential between two points in a borehole at substantially zero volts so as to produce a borehole interval of zero potential gradient. In a representative embodiment of this zero gradient form of the invention, survey and auxiliary currents are emitted from a central current-emitting electrode. The auxiliary current is returned to a pair of current return electrodes located on each side of the central electrode and the survey current is returned to another electrode. The potential distribution at locations above and below the central and auxiliary current return electrodes is measured and utilized to adjust one of the survey or auxiliary currents until a desired potential distribution at these locations is established. By so doing, the auxiliary current will act to force the survey current out of the borehole and into the formations when the mud column is more conductive than the adjoining formations.

Apparatus for practicing the invention and the methods thereof is illustrated in several embodiments.

The methods and apparatus of the present invention can find utility in most any situation where a conductive medium surrounding or near the exploring device hampers the investigation of the formations adjoining the conductive medium. Thus, the present invention can find utility with exploring devices of the type where a plurality of electrodes are mounted on a borehole wall-engaging pad member so that the survey current will be prevented from shorting through a conductive mudcake. Additionally, the present invention can be used in combination with the prior art focused electrode systems to prevent a conductive mud column from having an adverse effect on the investigation operation.

In another form of the invention, reciprocal arrangements of the above-mentioned embodiments can be used.

For a better understanding of the present invention, together with other and further objects thereof, reference is had to the following description taken in connection with the accompanying drawings, the scope of the invention being pointed out in the appended claims.

Referring to the drawings:

FIG. 5 is a reproduction of one of the curves of FIG. 3 (corresponding to $R_m = R_f$) for purposes of explaining certain features of the present invention;

FIG. 7 shows an exploring device in a borehole along with representations of the adjoining formations for the purpose of defining certain terms utilized in the explanation of the present invention;

FIG. 8 shows an electrode type exploring device in a borehole along with the accompanying electrical circuitry in accordance with another embodiment of the present invention;

FIG. 9 illustrates typical current flow patterns which could be expected from the investigating apparatus of FIG. 8;

FIG. 11 illustrates the utilization of the present invention for the case where a portion of the electrodes are mounted on a wall-engaging pad member;

FIGS. 12 and 14 illustrate various electrode arrays that could be mounted on the pad member of FIG. 11 for investigating the earth formations adjoining the borehole;

FIG. 16 illustrates apparatus for improving the prior art investigating apparatus illustrated in FIG. 15 in accordance with the present invention; and FIG. 17 illustrates how the apparatus of FIG. 8 can be modified to produce a reciprocal arrangement thereof.

Figure 1:
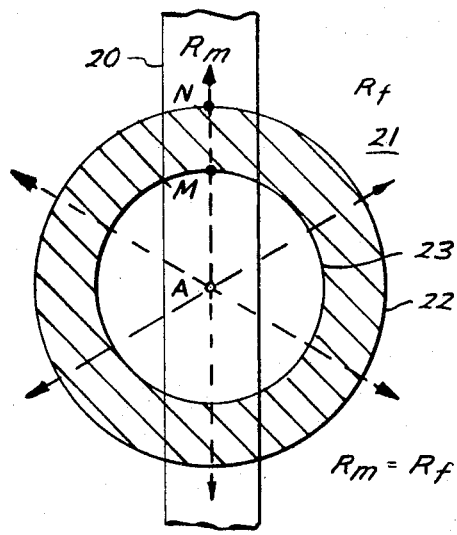
FIG. 1 shows a prior art nonfocused type electrode array in a borehole along with a representation of equipotential lines and current flow which could be expected under certain conditions.

Referring now to FIG. 1, there is shown a prior art electrode array situated in a borehole 20 filled with a conductive drilling mud having a resistivity $R_m$ for investigating an adjacent formation 21 having a resistivity $R_f$. The electrodes comprise a current-emitting electrode A and two potential measuring electrodes M and N. The current return electrode (not shown) is located at some considerable distance frm the electrodes A, M and N. In this FIG. 1 situation, the mud resistivity $R_m$ is considered to be substantially equal to the formation resistivity $R_f$ and thus the current flow (dotted lines) will be distributed evenly in all directions since the current return electrode is at electrical infinity.

With the known current distribution, the equipotential lines 22 and 23 passing through the measuring electrodes M and N can be drawn perpendicular to the current flow lines. In three dimensional space, these equipotential lines 22 and 23 will have the form of spherical shells. By measuring the current emitted from the current-emitting electrode A and the potential difference between the measure electrodes M and N, the resistivity of the shaded area of FIG. 1 can be determined. Thus, for example, assuming that the current emitted from electrode A is constant, the difference in the potentials measured by the electrodes M and N will vary in accordance with the resistivity of the shaded area of FIG. 1 through the application of Ohms Law.

Figure 2:
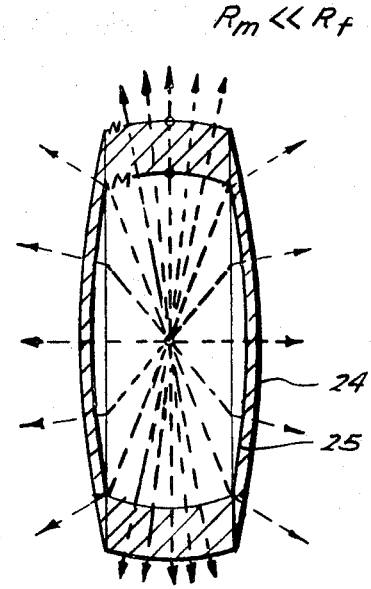
FIG. 2 shows the equipotential and current flow lines which could be expected under adverse conditions with the FIG. 1 electrode array.

Now referring to FIG. 2, there are shown equipotential lines 24, 25, and current flow lines (shown in dotted line form) when the mud resistivity $R_m$ is substantially less than the formation resistivty $R_f$. In this FIG. 2 case, most of the current emitted from the electrode A will travel through the high conductivity borehole fluids and will not penetrate into the formation. Thus, knowing that the equipotential lines are perpendicular to the current flow lines, the equipotential lines 24 and 25 will take the form shown in FIG. 2. Thus, in this extreme case, the difference in potential between the measure electrodes M and N will be strongly affected by the value of the mud resistivity $R_m$.

Figure 3:
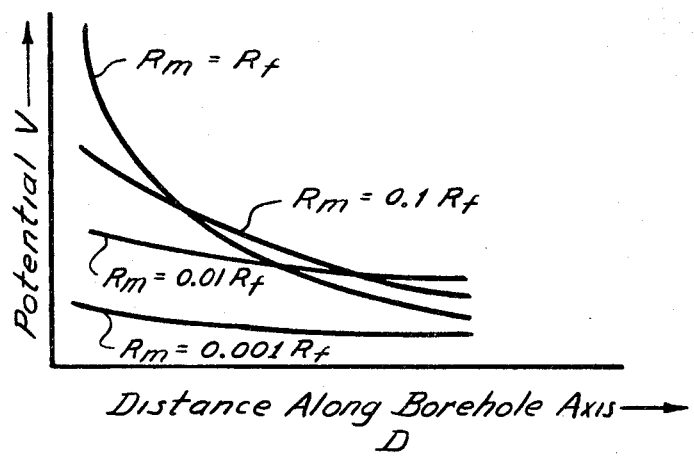
FIG. 3 is a plot of potential versus distance along the borehole axis when using an electrode type investigating system for various borehole conditions.

In FIG. 3, there is shown a 0 of voltage potential versus distance D along the borehole axis for various ratios of the mud resistivity $R_m$ to the formation resistivity $R_f$. If $R_m = R_f$, the entire medium surrounding the electrodes is one electrically homogeneous volume. In this homogeneous case, the voltage potential V will decrease as an inverse function of the distance D from the current source along the borehole axis (i.e., $V = \lambda(V_0/D)$, where $V_0$ is the potential at the current source and $\lambda$ is a constant characteristic of the current electrode $A_0$). Thus, the $R_m = R_f$ potential distribution curve of FIG. 3 corresponds to the spherical equipotential relationship shown in FIG. 1. As the mud resistivity becomes less than the formation resistivity, the potential versus distance curve tends to flatten out as illustrated in FIG. 3. This is as expected since the potential drop per unit distance through the borehole when the current flows through a highly conductive borehole or mud column will tend to be small.

From the above, with the electrode systems of FIGS. 1 and 2, it can be said that at any time the resistivity of the mud column is different from the resistivity of the adjoining formations, the equipotential lines will be different from the desired spherical distribution illustrated in FIG. 1. As is illustrated in FIG. 2, the resistivity of the mud column relative to that of the formation greatly affects the shape of the equipotential plot and thus greatly affects the determination of which portion of the formations and/or borehole is investigated. As was stated earlier, the prior art focused electrode exploring devices tend to minimize this mud column effect, but at the same time, tend to produce relatively deep radial investigation.

It is a purpose of the present invention to provide novel methods and apparatus for investigating resistivity or conductivity characteristics of a formation regardless of the conductivity of the mud column. It is also desired with the present invention to provide an exploring device with relatively shallow radial investigation characteristics which is, at the same time, relatively unaffected by a conductive mud column. In one form of the present invention, this is accomplished by setting up a potential distribution through the borehole which will tend to approximate the spherical equipotential distribution illustrated in FIG. 1 regardless of the difference in resistivity between the mud column and formation. This is accomplished by enforcing a potential distribution through the borehole as if the resistivity $R_m$ of the mud column was substantially equal to the resistivity $R_f$ of the formation. As discussed in connection with FIG. 3, this potential distribution curve for the homogeneous case of $R_m = R_f$ is a potential curve which decreases as an inverse function of distance along the borehole axis. By enforcing this potential distribution along the borehole axis, the potential should decrease in the same fashion in the formation provided the formation itself is homogeneous.

Figure 4:
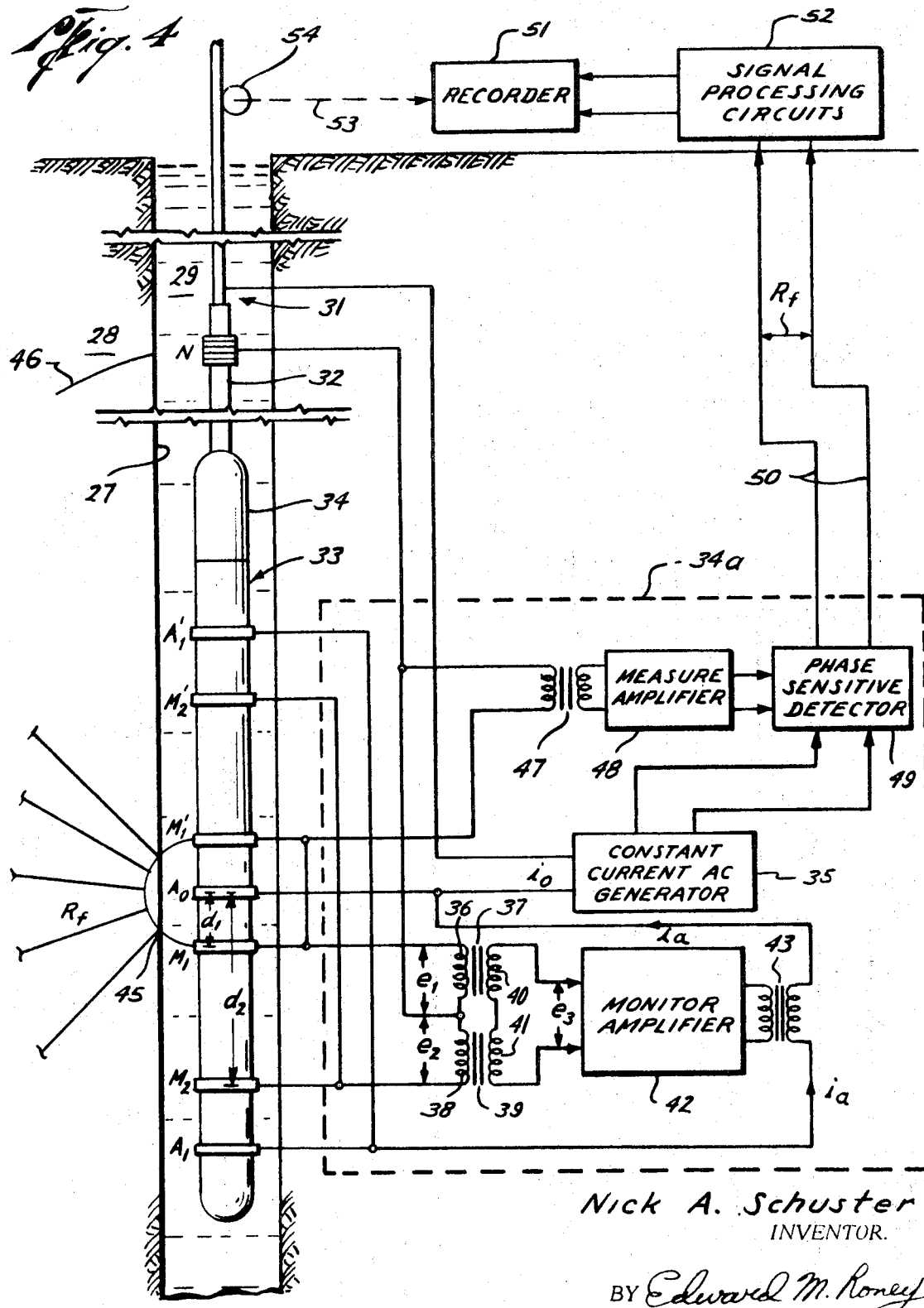
FIG. 4 shows an electrode type exploring device in a borehole along with electrical circuitry for energizing the electrodes in accordance with the present invention.

Now turning to FIG. 4, there is shown apparatus for investigating the resistivity or conductivity of adjoining earth formations without being unduly affected by the relative conductivity of the mud column. In the FIG. 4 apparatus, this is accomplished by controlling the potential at two points in the borehole in accordance with the homogeneous condition ($R_m = R_f$) curve of FIG. 3. More particularly, in FIG. 4, there is shown a means for carrying a plurality of electrodes through a borehole 27 filled with a conductive drilling mud for investigating adjoining earth formations 28. For purposes of explaining the operation of the FIG. 4 apparatus, the formations 28 will be assumed to be homogeneous. In FIG. 4, the carrying means includes a support means 33 which is suspended in the borehole 27 on the end of an armored multiconductor cable 31 of which the lower 100 feet or so is covered with a suitable insulating material 32. A remote potential measuring electrode N is mounted on this insulated portion of the cable 31 and is connected by a suitable electrical conductor to electrical circuitry located in the support member 33.

The electrode array also includes a central current-emitting electrode $A_0$ mounted on the support member 33 with a pair of symmetrical potential measuring electrodes $M_1$ and $M_1'$ located equal distances $d_1$ from $A_0$ on both sides thereof. The electrodes $M_1$ and $M_1'$ are electrically shorted together. A second pair of potential measure electrodes $M_2$ and $M_2'$ (also shorted together) are mounted on the support member 33 equal distances $d_2$ from $A_0$ on both sides thereof and at a greater distance therefrom than the first measure pair $M_1,M_1'$. A third set of electrodes (also shorted together) $A_1$ and $A_1'$ are mounted on the support member 33 at equal distances on both sides of the center electrode $A_0$ and at greater distances therefrom than the aforementioned measure electrodes. The exterior of the portion of support member 33 on which these electrodes are mounted is constructed of a nonconductive material. The upper portion 34 of the support member 33 is a fluid-tight housing which contains the electrical circuitry to which the aforementioned electrodes are connected.

Looking at the dotted line box 34a shown to the right of the borehole 27, electrical circuitry contained within the fluid-tight housing 34 is illustrated. A constant current generator 35 supplies a constant magnitude alternating current $i_o$ between the central current-emitting electrode $A_0$ and the armor of cable 31. The potential difference $e_1$ established between the measure electrodes $M_1,M_1'$ and the remote electrode N is applied across the primary winding 36 of a transformer 37 and the potential difference $e_2$ established between measure electrodes $M_2,M_2'$ and remote electrode N is applied across the primary winding 38 of a transformer 39. The secondary windings 40 and 41 of transformers 37 and 39 respectively are series connected and coupled to the input of a high gain amplifier 42.

The transformers 37 and 39 are wound in such a manner that the input voltage $e_3$ to amplifier 42 can be expressed as follows:

$$e_3 = e_2 - C\,e_1 \qquad 1$$

where C is a constant. (C will be defined later.) The amplifier 42 induces an output current $i_a$ in the secondary winding of a transformer 43, which current is emitted from the central current-emitting electrode $A_0$ and returned to the two end electrodes $A_1$ and $A_1'$ for return to the secondary winding of transformer 43.

The gain of amplifier 42 is sufficiently high that the input voltage $e_3$ thereto will be substantially zero volts. That is to say, amplifier 42 will supply sufficient auxiliary current $i_a$ between the central current-emitting electrode $A_0$ and the end electrodes $A_1$, $A_1'$ to maintain the input voltage $e_3$ substantially equal to zero. Thus, setting $e_3 = 0$, Equation 1 can be rewritten as:

$$e_2/e_1 = C \qquad (2)$$

Since the voltages $e_1$ and $e_2$ are measured with respect to the remote potential reference electrode N, which because of its remoteness from the current-emitting electrodes, is at or substantially near zero volts, $e_1$ and $e_2$ will represent the potentials with respect to zero volts on measure electrodes $M_1, M_1'$ and $M_2, M_2'$. Thus, Equation 2 can be rewritten as:

$$V_{M_2}/V_{M_3} = C \qquad (3)$$

where $V_{M_2}$ and $V_{M_1}$ are the potentials with respect to zero volts on measure electrodes $M_1, M_1'$ and $M_2, M_2'$ respectively.

Now concerning the value of C and referring to FIG. 5, there is shown the homogeneous potential distribution curve, i.e., the $R_m = R_f$ curve of FIG. 3, reproduced. The location of the electrodes of FIG. 4 are shown along the horizontal (distance) axis of FIG. 5. Since the potential decreases as an inverse function of distance from a current source in a homogeneous medium, the potential $V_{M_1}$ at the measuring electrode $M_1$ when $R_m = R_f$ will be:

$$V_{M_1} = (\lambda/d_1) V_0 \qquad (4)$$

where $V_0$ is the voltage potential at the source. Likewise, the potential $V_{M_2}$ at the mmeasuring electrode $M_2$ will be:

$$V_{M_2} = (\lambda/d_2) V_0 \qquad (5)$$

Combining Equations 4 and 5, we have:

$$V_{M_2}/V_{M_1} = d_1/d_2 \qquad (6)$$

Thus, comparing Equations 3 and 6, it is clear that the circuit constant C (windings ratio of transformers 37 and 39) will be equal to $d_1/d_2$ for the FIG. 4 apparatus to produce a potential distribution as if $R_m$ were equal to $R_f$ regardless of the value of $R_m$ relative to $R_f$.

In accordance with the operation of the feedback loop of FIG. 4 just discussed, the auxiliary current $i_a$ is continuously adjusted such that the potential $V_{M_2}$ is always equal to $(d_1/d_2) V_{M_1}$ in accordance with Equation 6. By so doing, a potential distribution curve will be produced by the apparatus of FIG. 4 in substantially the form shown in FIG. 5. As discussed in connection with FIGS. 1, 2 and 3 a potential distribution curve of the shape shown in FIG. 5 represents the potential distribution for a homogeneous case, (i.e., $R_m = R_f$). Thus, by enforcing this potential distribution in the borehole, a substantially spherical equipotential distribution similar to the one shown in FIG. 1 will be established regardless of the conductivity of the mud column relative to the formation. This effectively has the result of making the formation and mud column appear to be one homogeneous medium and thus any adverse affect of the mud column on the investigation of the formation is substantially eliminated.

It would perhaps be beneficial to also discuss this operation in terms of current flow. In this regard, since the survey current $i_0$ emitted from the central current-emitting electrode $A_0$ is returned to the relatively distant cable armor 31 and the auxiliary current $i_a$ is returned to the nearby electrodes $A_1, A_1'$, the auxiliary current $i_a$ will tend to pass primarily through the mud column thus forcing the survey current $i_0$ out into the formation for the investigation thereof. It is clear that the more conductive the mud column relative to the formation, the more auxiliary current $i_a$ will be generated to flow through the mud column in order to insure that the potential relationship between the measuring electrodes $M_1$ and $M_2$ is as set forth in Equation 6. If $R_m$ is equal to $R_f$, then there would be very little, if any, auxiliary current $i_a$ generated since the survey current $i_0$ alone would set up the required potential distribution for the same reasons as discussed in connection with FIG. 1.

Since the survey current $i_0$ is always at a constant value (i.e., RMS or peak-to-peak value) through the action of the constant current generator 35, the potential existing on the central current-emitting electrode $A_0$ will vary in proportion to the resistivity of the media surrounding this electrode. In terms of the potential distribution curve of FIG. 5, the entire curve will move up or down in dependence on this resistivity. To obtain a measure of the formation resistivity then, it is only necessary to measure the potential difference between two points in the borehole. Thus, assuming that the difference between the potential in the vicinity of the measure pair $M_1, M_1'$ and the potential of remote electrode N is measured, that portion of a homogeneous formation lying between the equipotential line 45 which passes through the measure electrode pair $M_1, M_1'$ and the equipotential line 46 which passes through the remote reference electrode N is investigated. Since the survey current return electrode (armor of cable 31) is remotely located relative to the central current-emitting electrode $A_0$ and the potential distribution curve of FIG. 5 is established in the borehole, the survey current will tend to radiate from the central electrode $A_0$ in a spherical fashion provided the formation itself is homogeneous. Thus, the equipotential lines 45 and 46 will be substantially shperical in shape as shown in FIG. 4. By spacing the $M_1, M_1'$ electrodes far enough from the central electrode $A_0$, the borehole will be substantially eliminated from investigation since the equipotential line 45 passes through the formation.

A measurement of the resistivity of the formation lying between the equipotential lines 45 and 46 is obtained by coupling this potential difference between electrodes $M_1, M_1'$ and N via a transformer 47 to a suitable high impedance input measuring amplifier 48. The output signal from measure amplifier 48 is supplied to the input of a phase-sensitive detector 49 which derives its phase reference signal from the constant current generator 35. The phase-sensitive detector 49 generates a varying DC output signal which is proportional to that portion of the measured signal which is in-phase with the survey current $i_0$, and thus is proportional to formation resistivity $R_f$.

This resistivity signal is supplied to the surface of the earth via a conductor pair 50 (which in reality passes through the cable 31) to a recorder 51 via suitable signal processing circuits 52. The recorder 51 is driven as a function of cable movement via a shaft 53 coupled to a rotating wheel 54. The wheel 54 engages the cable 31 so as to rotate as a function of cable movement. By this means, the resistivity signal $R_f$ is recorded by recorder 51 as a function of borehole depth to produce a log of resistivity versus depth.

Figure 6:
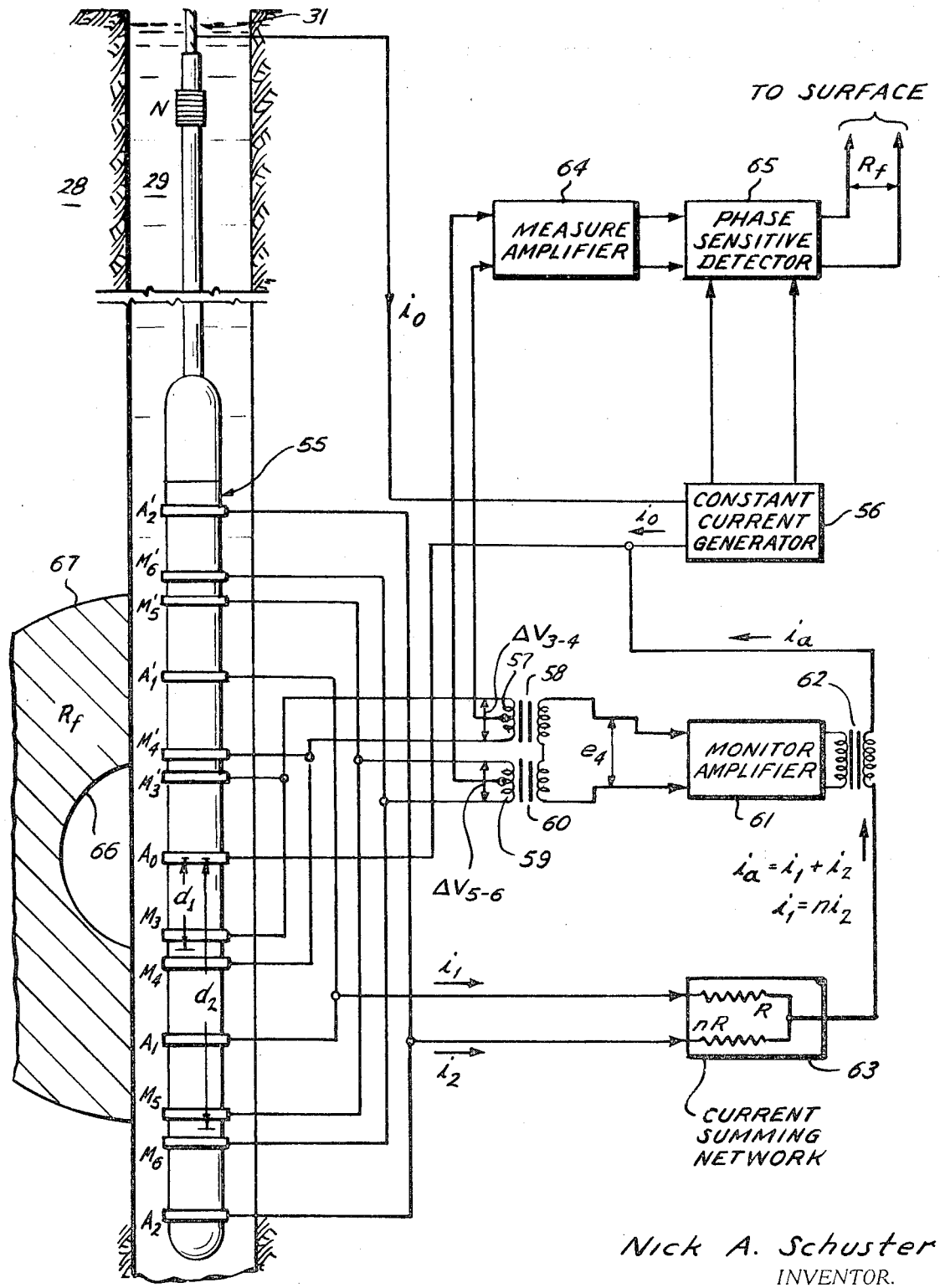
FIG. 6 shows an electrode type exploring device in a borehole in accordance with another embodiment of the present invention.

It is also possible to control the potential gradient at two points in the borehole to produce the potential distribution curve of FIG. 5. The potential gradient is defined as $\Delta V/\Delta D$ where $\Delta V$ is the difference in potential between two fairly closely spaced points and $\Delta D$ is the spacing between these two points. Referring now to FIG. 6, there is shown apparatus for accomplishing this in accordance with the present invention. Like the FIG. 4 embodiment, the FIG. 6 embodiment includes a plurality of electrodes mounted on a support member 55. As in the FIG. 4 embodiment, a central current-emitting electrode $A_0$ is surrounded on both the upper and lower sides thereof by a symmetrical electrode array comprising in the order of their spacings from the central electrode $A_0$, the electrodes $M_3-M_3'$, $M_4-M_4'$; $A_1-A_1'$, $M_5-M_5'$, $M_6-M_6'$ and $A_2-A_2'$. The $M_3$ and $M_4$ electrodes are spaced relatively close together and the center point therebetween is a distance $d_1$ from the current source $A_0$. The $M_5$ and $M_6$ electrodes are likewise spaced relatively close together and the center point therebetween is a distance $d_2$ from the current source $A_0$. (Correspondingly, the $M_3'-M_4'$ and $M_5'-M_6'$ are each spaced close together and distances of $d_1$ and $d_2$ from $A_0$ respectively.) As in the FIG. 4 embodiment, similarly designated electrodes on both sides of the central electrode $A_0$ are shorted together.

The constant current generator 56 generates a constant magnitude AC survey current $i_0$ which is emitted from the central current-emitting electrode $A_0$ and returns to the generator 56 via the armor of cable 31. The difference in potential $\Delta V_{3-4}$ between the potentials on the first measure electrode pair $M_3, M_3'$ and $M_4, M_4'$ is developed across the primary winding 57 of a transformer 58 and the difference in potential $\Delta V_{5-6}$ developed across the measure electrode pair $M_5, M_5'$ and $M_6, M_6'$ is supplied to the primary winding 59 of a transformer 60. The secondary winding of transformers 58 and 60 are series connected and coupled to the input of a high gain amplifier 61. The windings of transformers 58 and 60 are set such that the input voltage $e_4$ to the monitor amplifier 61 is:

$$e_4 = \Delta V_{5-6} - C_1 \Delta V_{3-4} \qquad (7)$$

where $C_1$ is a constant determined by the winding ratio of transformers 58 and 60. The amplifier 61 develops an auxiliary current $i_a$ in the secondary winding of a transformer 62 which is emitted from the central current-emitting electrode $A_0$ and returned to the auxiliary current return electrodes $A_1, A_1'$, and $A_2$ and $A_2'$. A weighted current summing network 63 sums the currents $i_1$ and $i_2$ which are received by the electrodes $A_1, A_1'$ and $A_2, A_2'$ respectively for return to the secondary winding of transformer 62. These currents $i_1$ and $i_2$ are summed in a fixed ratio so that $i_1 = ni_2$. To accomplish this, the $i_1$ current passes through a resistor of value R and the $i_2$ current passes through a resistor of value $nR$, where R is substantially higher than the resistance of the remainder of the feedback loop.

As in the FIG. 4 embodiment, the gain of amplifier 61 is sufficiently high that enough auxiliary current $i_a$ will be supplied between the central current-emitting electrode $A_0$ and the return electrodes $A_1-A_1'$, $A_2-A_2'$ to maintain the input voltage $e_4$ to amplifier 61 at substantially zero volts. Thus setting $e_4 = 0$, Equation 7 can be rewritten as:

$$\Delta V_{5-6}/\Delta V_{3-4} = C_2 \qquad (8)$$

To determine the constant $C_2$ and turning to FIG. 5, the locations of the electrodes $M_3$, $M_4$, $M_5$ and $M_6$ are represented as points on the potential distribution curve. By taking the derivative of the earlier discussed potential distribution function $V = \lambda(V_0/D)$, the slope of the potential distribution curve at any point spaced a distance D from the current source is:

$$\Delta V/\Delta D = \lambda(V_0/D^2) \qquad (9)$$

As stated earlier, $\Delta V/\Delta D$ is the potential gradient. Thus, Equation 9 written for the potential gradient measured by the measuring electrodes $M_3, M_3'$ and $M_4, M_4'$ is:

$$\Delta V_{3-4}/\Delta D_{3-4} = \lambda(V_0/d_1^2) \qquad (10)$$

and written for the potential gradient measured by the mesuring electrodes $M_5, M_5'$ and $M_6, M_6'$ is:

$$\Delta V_{5-6}/\Delta D_{5-6} = \lambda(V_0/d_2^2) \qquad (11)$$

Combining Equations 10 and 11, we have:

$$\Delta V_{5-6}/\Delta V_{3-4} = d_1^2/d_2^2 \qquad (12)$$

(By making $\Delta D_{3-4} = \Delta D_{5-6}$, these terms drop out, although, if they were unequal, it would only change the constant portion $(d_1^2/d_2^2)$ of Equation 12.) Comparing Equations 8 and 12, it is clear that the circuit constant $C_2$ should be equal to $d_1^2/d_2^2$ to establish the desired potential distribution.

Thus, it can be seen that the FIG. 6 apparatus measures the potential gradient at one location in the borehole by means of the measure electrodes $M_3$ and $M_4$ and the potential gradient at a second location in the borehole by means of the measuring electrodes $M_5$ and $M_6$ and adjusts the auxiliary current $i_a$ to maintain a constant ratio between these potential gradients. In other words, the ratio of the slopes of the FIG. 5 curve at two borehole locations is maintained constant. By making this constant ratio equal to $d_1^2/d_2^2$ a potential distribution curve substantially as shown in FIG. 5 will be produced by the FIG. 6 apparatus and a spherical equipotential distribution will be established in the media surrounding the electrode array to thus eliminate the mud column as a disrupting factor in the measurement of the resistivity or conductivity of the formations. The electrode spacings and the value of $n$ can be selected to produce the desired results. (Desirably, $n$ can be selected to be approximately the same as the squared elecrode spacing ratio $d_2^2/d_1^2$.)

As with the FIG. 4 apparatus, the survey current $i_0$ emitted from the central current-emitting electrode $A_0$ of FIG. 6 is constant and thus the entire potential distribution curve of FIG. 5 will increase or decrease as a function of resistivity. To provide a measure of the formation resistivity, the potentials on the center taps of primary windings 57 and 59 of transformers 58 and 60 are supplied to the input of a suitable measure amplifier 64. That component of the output signal from measure amplifier 64 that is in-phase with the survey current $i_0$ is detected by a phase-sensitive detector 65 which derives its phase reference signal from the generator 56. The resulting detected signal is supplied to the surface of the earth as a varying DC signal proportional to the formation resistivity $R_f$.

Since the potentials supplied to the measure amplifier 64 are derived from the center taps of the primary windings of transformers 58 and 60, the difference between the potential existing midway between measure electrodes $M_3$ and $M_4$ and the potential existing midway between measure electrodes $M_5$ and $M_6$ is measured. For a homogeneous formation then, the measured resistivity is representative of the resistivity of that portion of the formation which lies between the spherically shaped equipotential line 66 which passes through a point midway between the measure electrodes $M_3$ and $M_4$ and a point midway between the measure electrodes $M_3'$ and $M_4'$ and the spherically shaped equipotential line 67 which passes through a point midway between the measure electrodes $M_5$ and $M_6$ and a point midway between the measure electrodes $M_5'$ and $M_6'$. This area is shown as the hatched line area in FIG. 6. It should be noted that, if desired, another measure circuit could be utilized to provide a measure of the formation lying beyond this hatched line area in FIG. 6 by measuring the potential difference between the center tap of either primary winding 57 or 59 and the remote electrode N.

In the discussion up to this point, it has been assumed that the formation itself is relatively homogeneous, the only complicating factor being a highly conductive mud column. The apparatus of FIGS. 4 and 6 each operates to substantially minimize the adverse effects of this conductive mud column on the formation resistivity measurements. However, as is many times the case, the formations are relatively nonhomogeneous. This non-homogeneity can take the form, for example, of boundaries between the formation beds where one formation has a resistivity substantially different from an adjoining formation. Additionally, in permeable formations, the drilling mud will invade the formation thus displacing all or a portion of the naturally occurring formation fluids contained in the invaded portion. In many cases, the resistivity of the invaded formation zone will be different from the resistivity of the noninvaded zone and sometimes the contrast will be quite large.

Referring to FIG. 7, there is shown a diagram of these various zones. A logging tool 70 is shown in a borehole 71 immersed in a mud column with a resistivity $R_m$. The invaded zone having a resistivity $R_{xo}$ is the zone next adjacent to the borehole 71 and the noninvaded zone having a resistivity $R_t$ is that portion of the formation furthest removed from the borehole 71. The radius of invasion $r_i$ is the distance between the center of the borehole and the interface between the invaded and noninvaded zones. In addition, nonhomogeneity occurs when formation beds having a resistivity $R_s$ different from the resistivity of the zone presently under investigation are located adjacent the investigated zone.

As discussed earlier, the apparatus illustrated in FIGS. 4 and 6 will set up a potential distribution curve illustrated in FIG. 5 along the borehole axis as well as radially into the formation. However, if the formation itself is not homogeneous, an exploring device attempting to establish the potential distribution for a homogeneous formation will, in effect, be attempting to establish an unnatural potential distribution which may cause measurement errors, especially where the radius of invasion $r_i$ is relatively shallow and the resistivity contrast relatively high.

Thus referring to FIG. 8, there is shown another form of the present invention wherein the resistivity can be measured for substantially all formation conditions and yet the effect of a highly conductive mud column on such measurements will be substantially minimized. This is accomplished by maintaining a constant potential distribution in only one region on each side of the central current-emitting electrode. In this FIG. 8 embodiment, a support member 70 is supported in the borehole on the end of the cable 71. The support member 70 includes an electrode array comprising a central current-emitting electrode $A_0$ and a plurality of symmetrically disposed electrodes on the upper and lower sides of the central $A_0$ electrode. These symmetrical electrodes, in the order of their spacings from the central electrode $A_0$, are $M_0-M_0'$, $A_1-A_1'$, $M_1-M_1'$ and $M_2-M_2'$. As in the prior embodiments, those electrodes having the similar designation (prime or no prime) are shorted together.

In FIG. 8, there is also shown a coil system or induction logging system mounted on the support member 70. Only two illustrative coils 73 and 74 are shown, which coils are embedded in a layer of rubber material (not shown) which encircle a center mandrel 75. The center mandrel 75 and coils are encircled by an outer sleeve member 76 of cylindrical shape. (Part of this sleeve member 76 is broken away in FIG. 8 for purposes of showing the coils located therebelow.)

Concerning the electrode construction, the $A_0$, $A_1$ and $A_1'$ current electrodes individually comprise a series of small rectangular metal plates which are positioned to encircle the circumference of the sleeve member 76. The rectangular plates of each electrode are connected together by means of a closed loop of slightly resistive wire which encircles the sleeve member 76 immediately below the rectangular plates. The measuring electrodes $M_0$, $M_0'$, $M_1$, $M_1'$, $M_2$ and $M_2'$, on the other hand, are constructed in a similar manner except that small metal discs or buttons are used in place of the rectangular plates since these measuring electrodes do not emit or receive a large amount of current as do the current electrodes $A_0$, $A_1$ and $A_1'$. This electrode construction could, of course, be used with any electrode system discussed herein and is not limited to just the FIG. 8 embodiment.

By utilizing the electrode construction shown in FIG. 8, the electrodes of the electrode array will not take the form of a closed conductive loop and thus will have a negligible influence on the operation of the induction logging system. In this manner, an electrode array and a coil array can both be utilized simultaneously on the same support member. For a more detailed explanation of the construction of the coils and electrodes of FIG. 8, see U.S. Pat. No. 3,329,889 granted to D. R. Tanguy on July 4, 1967.

Now concerning the electronic circuitry contained within the fluid-tight housing 70, refer to the circuitry shown within the dotted line box 70a, which corresponds to the fluid-tight housing 70. An oscillator 78 couples a constant reference voltage $V_{ref}$ across the secondary winding 79 of a transformer 80. One side of the secondary winding 79 is connected to the center tap of the primary winding 81 of a transformer 82. The measure electrodes $M_1,M_1'$ are connected to one side of the primary winding 81 and measure electrodes $M_2,M_2'$ are connected to the other side thereof. The other side of secondary winding 79 is connected to the measure electrode $M_0$ and $M_0'$ via the primary winding 83 of a transformer 84. The secondary winding of transformer 84 is coupled to the input of a high gain amplifier 85 which supplies sufficient auxiliary current $i_a$ between the control current-emitting electrode $A_0$ and the current return electrodes $A_1,A_1'$ by way of a transformer 86 such as to maintain the potential $e_5$ across the primary winding 83 of transformer 84 at substantially zero volts.

The equation for the voltage $e_5$ developed across the primary winding 83 can be expressed as:

$$e_5 = V_{M_0} - (V_{ref} + V_{M_{1-2}})$$

(13)

where $V_{M_0}$ is the voltage on the measuring electrodes $M_0$ and $M_0'$ and $V_{M_{1-2}}$ is the voltage existing on the center tap of primary winding 81 of transformer 82, and thus the potential existing at a point between the measuring electrodes $M_1$ and $M_2$ (and likewise $M_1'$ and $M_2'$). Since the action of amplifier 85 supplying auxiliary current $i_a$ between the electrodes $A_0$ and $A_1-A_1'$ maintains the voltage $e_5$ developed across primary winding 83 at substantially zero volts, Equation 13 can be rewritten as:

$$V_{M_0} - V_{M_{1-2}} = V_{ref}$$

(14)

Equation 14 states that this feedback circuit just described will operate to maintain the potential difference between the measuring electrodes $M_0,M_0'$ and a point intermediate the measuring electrodes $M_1,M_1'$ and $M_2,M_2'$ at a constant reference level. This reference level is the constant reference voltage $V_{ref}$ developed across the secondary winding 79 of transformer 80.

A signal proportional to the potential difference between the measure electrodes $M_1,M_1'$ and $M_2,M_2'$ is supplied to an amplifier 87 by way of the transformer 82 and the "zero gradient" contact of a double-throw switch 180. Amplifier 87 supplies sufficient survey current $i_0$ between the central current-emitting electrode $A_0$ and the outer metal sheath of the fluid-tight housing 70 via a transformer 88 to maintain a zero potential difference between the measure electrodes $M_1,M_1'$ and $M_2,M_2'$.

To summarize the operation of that portion of the FIG. 8 apparatus described thus far, refer to FIGS. 8 and 9 in conjunction where FIG. 9 shows the current flow pattern produced by the apparatus of FIG. 8 in a typical situation. The amplifier 85 produces sufficient auxiliary current $i_a$ to maintain a constant potential difference between the equipotential line 94 which passes through the measuring electrodes $M_0$ and $M_0'$ and the equipotential line 95 which passes through a point between the measuring electrodes $M_1,M_1'$ and $M_2,M_2'$.

The amplifier 87, on the other hand, supplies sufficient survey current $i_0$ between the central current-emitting electrode $A_0$ and the outer metallic sheath of the housing 77 to establish a substantially zero potential gradient (or zero electric field) between the measuring electrodes $M_1,M_1'$ and $M_2,M_2'$. By doing so, it is insured that no current will flow through the borehole in a direction parallel to the borehole axis in the vicinity of the measuring electrodes $M_1,M_1'$ and $M_2,M_2'$. By this means, the borehole will be electrically plugged at the measuring electrodes $M_1,M_1'$ and $M_2,M_2'$ the same as if electrical insulators were placed in the borehole at these two locations. This then prevents the survey current $i_0$ from shorting through the borehole to produce the effect discussed in connction with FIG. 2.

Since the auxiliary current return electrodes are inside the electrical plugs (points of zero gradient) on both sides of the central current-emitting electrode $A_0$ and the survey current return electrode (metal sheath 77) is outside the electrical plug, the auxiliary current $i_a$ will flow primarily in the borehole thus forcing the survey current $i_0$ out of the borehole and into the formation, as shown in FIG. 9. The auxiliary current $i_a$ and survey current $i_0$ will tend to break in opposite directions in the vicinity of the zero gradient locations with the auxiliary current $i_a$ being pulled back to the auxiliary return electrodes $A_1$ and $A_1'$ and the survey current $i_0$ tending to flow in the opposite direction away from the current electrodes $A_0$, $A_1$ and $A_1'$.

It should be noted here that even though the auxiliary current $i_a$ is no longer forcing the survey current $i_0$ away from the conductive fluid-filled borehole at borehole locations above the measuring electrodes $M_1'-M_2'$ and below the measuring electrodes $M_1-M_2$, the dimensions of the borehole become important as the survey current moves further and further away from the central current-emitting electrode $A_0$. Thus, even though the borehole may be far more conductive than the formation, as the survey current moves further away from the $A_0$ electrode, it will tend to spread out into the formation. By so doing, the volume of formation through which the survey current $i_0$ passes becomes substantially greater than the volume of the mud column as the distance from the central electrode $A_0'$ increases and thus the overall resistance offered to the survey current by the formation becomes less than the overall resistance of the mud column. Thus, by appropriately placing the measuring electrodes $M_1,M_1'$ and $M_2,M_2'$, the survey current will not have a tendency to return to the borehole at a distance away from the $A_0$ electrode where the effect of the auxiliary current has diminished.

The apparatus of FIG. 8 can produce a relatively shallow investigation of the formation. How shallow depends on the spacings between electrodes and the dimensions of the electrodes. This can be seen in FIG. 9 by observing that the auxiliary current $i_a$ is constrained primarily to the mud column and thus the survey current $i_0$ does not have a tendency to penetrate deeply into the formation. This is contrasted with the so-called "focused electrode" systems which force survey current deeply into a formation through the action of focusing current emitted from nearby focusing electrodes, which focusing current is in-phase with the survey current. Electrode systems of this type can be found in U.S. Pat. No. 2,712,627 granted to H. G. Doll on July 5, 1955 or U.S. Pat. No. 3,031,612 granted to M. F. Easterling on Apr. 24, 1962. It should be noted here that the potential on the auxiliary electrodes $A_1$ and $A_1'$ of the apparatus of the present invention is 180° out-of-phase with the potential on the central current-emitting electrode $A_0$ as compared with conventional focused electrode systems where the potentials of the survey and focusing electrodes are in-phase.

The radial depth of investigation of the apparatus of the present invention can be selected by properly selecting the placement and size of the electrodes. Thus, for example, by moving the measuring electrodes $M_1,M_1'$ and $M_2,M_2'$ of FIG. 8 closer to the central electrode $A_0$, the radial depth of investigation becomes less. However, if moved too close, the borehole effect becomes a problem (i.e., much of the survey current would return through the borehole if it is conductive enough). Obviously, a compromise between the two conflicting considerations is in order if shallow investigation is desired.

Additionally, the placement of the survey current return electrode is somewhat of a factor in determining the radial depth of investigation if this electrode is relatively close to $A_0$. As shown in FIG. 8, the current return for the survey current $i_0$ is the metal housing 77 which is located relatively close to the current-emitting electrode $A_0$ but exterior of the measuring electrodes $M_1,M_1'$ and $M_2,M_2'$. By so doing, the survey current $i_0$ is prevented from penetrating too deeply into the formations. Recalling that equipotential lines are perpendicular to current flow lines, the equipotential lines of FIG. 8 will no longer be spherically shaped since the survey current $i_0$ is being drawn toward the housing 77. Thus, the depth of investigation will tend to be relatively shallow as shown by the equipotential lines 94 and 95 in FIG. 8. If desired however, this current return could be placed on the armor of the cable 71 as in the FIGS. 5 and 6 embodiments or these embodiments could have the $i_0$ current return electrode positioned as in the FIG. 8 embodiment.

After extensive research and experimentation, a desirable spacing of the electrodes has been found to be: $A_0$ to $M_0$ and $M_0' = +$ and $- 4.4$ inches; $A_0$ to $A_1$ and $A_1' = +$ and $- 8$ inches; $A_0$ to $M_1$ and $M_1' = +$ and $- 19$ inches; $A_0$ to $M_2$ and $M_2' = +$ and $- 23$ inches; and $A_0$ to the housing $77 = 60$ inches with the housing 77 extending upward another 2 feet or so.

Since the equipotential lines 94 and 96 of FIG. 8 have a constant potential difference therebetween, it is clear that to obtain a measure of this hatched line portion of the formation shown in FIG. 8, it is merely necessary to measure the survey current which passes therethrough to obtain a measure of the conductivity thereof. To accomplish this, a very low resistance measure resistor 89 is inserted in series with the secondary winding 90 of transformer 88 so that a voltage proportional to the magnitude of survey current $i_0$ is developed across this resistor 89. This measure voltage is applied to a high input impedance measure amplifier 91 whose output signal is supplied to a phase-sensitive detector 92. The phase-sensitive detector 92 detects that portion of the measured voltage from measure amplifier 91 which in in-phase with the oscillator 78 output signal and provides a varying DC signal proportional to the conductivity $\sigma_{z0}$ of the invaded zone (since the investigation is very shallow) to the surface of the earth.

It should be noted at this point that even though the survey current $i_0$ was generated in response to the potential difference between the measure electrodes $M_1,M_1'$ and $M_2,M_2'$ and the auxiliary current $i_a$ was generated in response to the potential difference between the $M_0,M_0'$ measuring electrodes and a point between the $M_1,M_1'$ and $M_2,M_2'$ electrodes, these two functions could be reversed. If this change were made, it would be necessary to switch the return electrodes which are connected to the secondary windings of transformers 86 and 88 so that the survey current $i_0$ will be returning from the housing 77 to the secondary winding of transformer 86 and the auxiliary current returning from the electrodes $A_1,A_1'$ to the secondary winding 90 of transformer 88. Measure resistor 89 would then be inserted in series with the secondary winding of transformer 86 to obtain a measure of the survey current. Additionally, even though a constant voltage system has been shown in FIG. 8 (which could be adapted to the FIGS. 4 and 6 embodiments as well), a constant current system could just as easily be utilized.

It would be desirable at this point to briefly compare the form of the invention depicted in FIG. 8 with that depicted in FIGS. 4 and 6. The form of the invention illustrated in FIGS. 4 and 6 utilizes two points of control on each side of the central $A_0$ electrode for maintaining a potential distribution substantially as shown in FIG. 5. Thus, the FIG. 4 apparatus maintains a constant ratio of the potentials measured by electrodes $M_1,M_1'$ and $M_2,M_2'$ while the apparatus of FIG. 6 maintains a constant ratio of the potential gradients at the electrode pairs $M_3,M_3'$, $M_4,M_4'$ and $M_5,M_5'$, $M_6,M_6'$ to achieve the potential distribution curve of FIG. 5. The form of the invention shown in FIG. 8, on the other hand, only utilizes one point of control on each side of the central $A_0$ electrode, namely, a zero potential gradient at the measuring electrodes $M_1,M_1'$ and $M_2,M_2'$. By so doing, the borehole is electrically plugged thus forcing the survey current to flow outwardly into the formation and not short through the borehole.

Thus, in a homogeneous formation, a potential distribution curve somewhat similar to that shown in FIG. 5 will be produced by the FIG. 8 apparatus in much the same manner as in the FIGS. 4 and 6 apparatus. However, when the formation is relatively nonhomogeneous, the FIGS. 4 and 6 apparatus will attempt to establish the homogeneous case or type potential distribution in this nonhomogeneous formation which may tend to produce errors in the measurements while the FIG. 8 apparatus will allow the potential distrubution in the formation to take its natural course, but without undue influence from the mud column.

It will be recalled from a discussion of FIG. 5 that to produce a spherical equipotential distribution in a homogeneous formation, the potential distribution depicted in FIG. 5 must be established in the formation. However, since the system of FIG. 8 establishes a region of zero potential gradient on both sides of the central $A_0$ electrode, it can be seen that even if $R_m = R_f$ and the formation itself is homogeneous, the FIG. 8 apparatus will not establish a spherical equipotential distribution. However, if the monitoring electrodes $M_1,M_1'—M_2,M_2'$ are located at a sufficient distance from the central survey electrode $A_0$, the potential distribution will be so near spherical that the simplicity of the electronic circuitry is worth the slight error. (Note: This error can be corrected for by suitable correction charts.) The reason for this simplicity is that it is easier to maintain a zero potential gradient than a finite value thereof.

If however, an exact spherical distribution were considered desirable for the homogeneous formation case, the FIG. 8 circuitry could be modified to bring this about by establishing a finite potential gradient at the monitoring electrodes $M_1,M_1'—M_2,M_2'$. This could be accomplished, for example, by adding a constant reference amplitude signal derived from the oscillator 78 by way of another secondary winding 79a of the transformer 80 with the voltage developed across the secondary winding 82a of transformer 82. Thus, in FIG. 8, the switch 180 would be positioned in the "finite gradient" position so that the $i_0$ amplifier 87 will cause sufficient survey current to be emitted from the $A_0$ electrode to maintain $V_{M_{1-2}}$ equal to the reference voltage developed across the secondary winding 79a. The value of this gradient can be set by suitably selecting the number of turns for secondary winding 79a. Desirably, this gradient should be maintained at a value which will maintain a spherical equipotential distribution in a homogeneous formation. Thus, referring to FIG. 5, if the measuring electrodes $M_1,M_1'$ and $M_2,M_2'$ are at the locations designated 184 and 185, the reference voltage developed across the secondary winding 79a would be set at a value to produce a gradient defined by the slope of the curve at the region defined by the points 184 and 185.

In this alternative FIG. 8 case, the current flow through the borehole would be regulated to a desired degree thus preventing very much of the survey current from shorting through a conductive mud column. Thus, in a homogeneous formation, the amount of current allowed to pass through the borehole would be no greater than the current flow in any other direction thus establishing the spherical equipotential situation of FIG. 1. However, if the formation is nonhomogeneous, the potential distribution in the formation can take any form since the potential distribution for a homogeneous formation will not be enforced along the length of the electrode array. Effectively, then, in this modified version of FIG. 8, the borehole is electrically plugged at the measuring measuring electrodes $M_1,M_2'$ and $M_2,M_2'$ except for a small flow of survey current.

It should be noted at this point that even though the FIG. 8 apparatus maintains a constant potential difference between two points along the electrode array and the FIGS. 4 and 6 apparatus maintain a constant survey current flow, these controls cannot be classed as controls necessary for performing the objects of the present invention. Instead, these constant voltage and constant current controls are merely controls of convenience rather than necessity. That is to say, by maintaining either the voltage or current constant, it is only necessary to measure the other variable electrical parameter to obtain a measure of either the resistivity or conductivity of the formation. The FIGS. 4, 6 and 8 apparatus would work just as well is neither the voltage nor current were maintained constant and the variations in both parameters measured so that a ratio of voltage to current would produce a resistivity measurement. Moreover, in the FIGS. 4, 6 and 8 embodiments, either the $i_a$ or $i_0$ current could be utilized to control the potential distribution.

It should also be noted that the equipotential plots discussed earlier, as well as those to be discussed later, are estimates of the real situation since it is impossible to measure them point by point in the formation. Also, these equipotential plots are drawn for homogeneous formations and will tend to become somewhat distorted in nonhomogeneous formations.

As set forth above, it is only necessary to have one region of control on each side of the central $A_0$ electrode and one control parameter to produce the desired results in accordance with the present invention. However, if desired, there could be a plurality of zero (or finite) potential gradient control regions to achieve the objects of the present invention. Thus, referring to FIG. 10, there is shown a more elaborate embodiment of the present invention utilizing the technique set forth in FIG. 8. As in the prior embodiments, the central current-emitting electrode $A_0$ is surrounded on both the upper and lower sides by a symmetrical electrode array comprising in the order of their distance from the central electride $A_0$, the electrodes $M_0,M_0'$; $A_1,A_1'$; $M_1,M_1'$; $M_2,M_2'$; $A_2,A_2'$; $A_3,A_3'$; $M_3,M_3'$ and $M_4,M_4'$. The $M_1,M_1'$ and $M_2,M_2'$ measuring electrodes are located relatively close together as are the measuring electrodes $M_3,M_3'$ and $M_4,M_4'$. As before, the upper portion of the support member 102 comprises a fluid-tight housing 103 containing the electrical circuitry.

Figure 10:
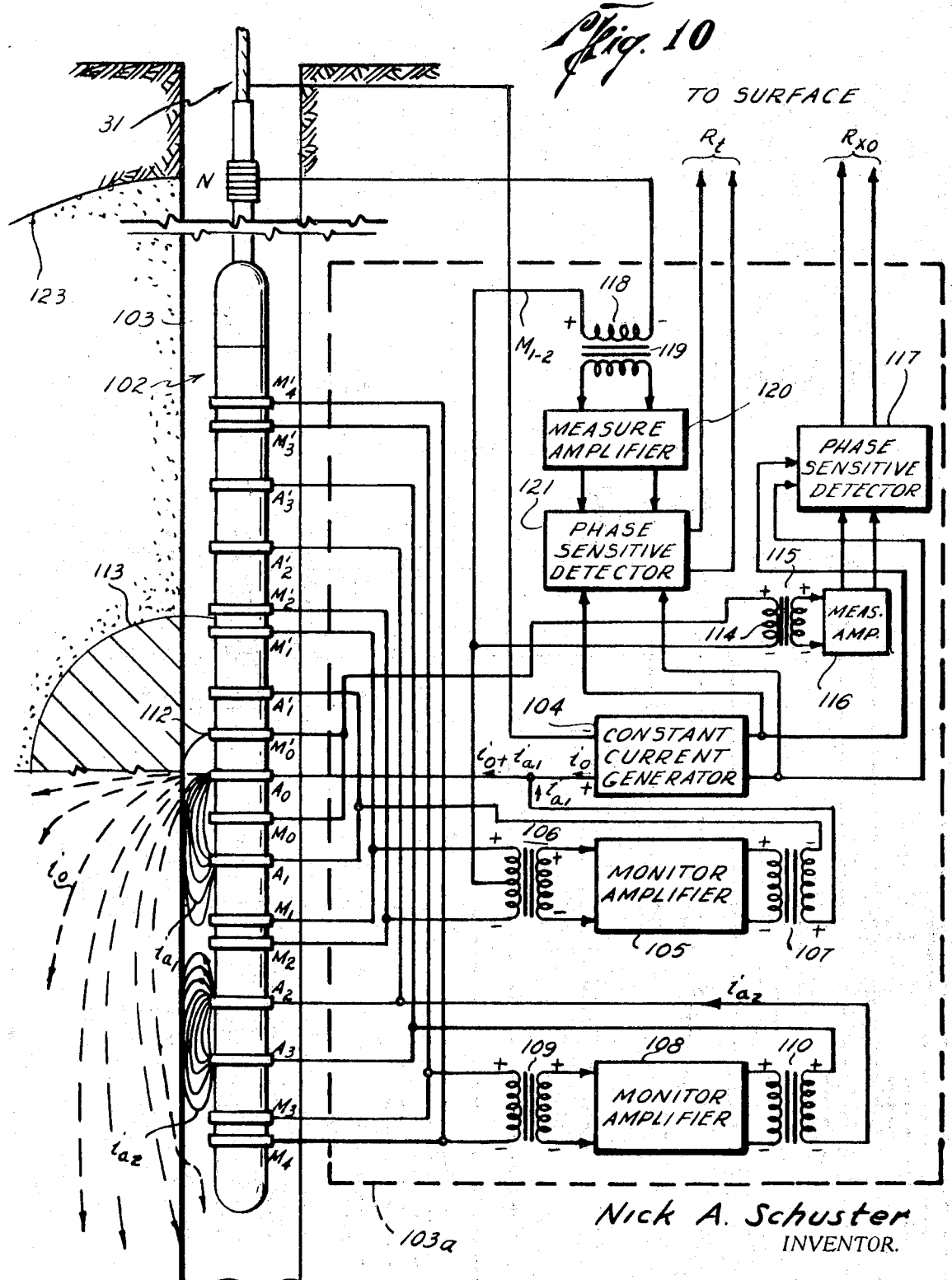
FIG. 10 illustrates another embodiment of the present invention.

This electrical circuitry is shown in the dotted line box 103a in FIG. 10 and includes a constant current generator 104 which supplies a constant value of survey current $i_0$ between the central current-emitting electrode $A_0$ and the armor of the cable 31. A high gain amplifier 105 is responsive to the potential gradient between the measuring electordes $M_1,M_1'$ and $M_2,M_2'$ via a transformer 106 for supplying sufficient auxiliary current $i_{a1}$ between the central current-emitting electrode $A_0$ and the current return electrode $A_1,A_1'$ via a transformer 107. As before, the magnitude of this auxiliary current $i_{a1}$ is sufficient to maintain the potential gradient between the measuring electrodes $M_1,M_1'$ and $M_2,M_2'$ at substantially zero volts. This operation is the same as in the FIG. 8 embodiment. However, in this FIG. 10 embodiment, another high gain amplifier 108 is responsive to the potential gradient between the measuring electrodes $M_3,M_3'$ and $M_4,M_4'$ via a transformer 109 to supply sufficient auxiliary current $i_{a2}$ between the current electrodes $A_2,A_2'$ and $A_3,A_3'$ so as to maintain the potential gradient between the measuring electrodes $M_3,M_3'$ and $M_4,M_4'$ at substantially zero volts. Thus, it can be seen that the apparatus of FIG. 10 operates to plug the borehole at two separate points on each side of the central current-emitting electrode $A_0$. By this means, the survey current $i_0$ emitted from the central electrode $A_0$ will be forced out of the borehole into the formation for a greater interval than would be possible with the FIG. 8 apparatus. This could be advantageous for example if the mud column were so much more conductive than the formation that a great amount of the survey current $i_0$ would tend to be drawn into the mud column at a point just beyond the first measuring electrodes $M_1, M_1'$ and $M_2, M_2'$. Additionally, it has been found that the radial depth of investigation will be slightly decreased if this second loop is utilized.

To obtain a measure of the resistivity of the adjoining formations with the FIG. 10 apparatus, a number of possibilities exist. For example, the potential difference between the measuring electrodes $M_0, M_0'$ and a point intermediate of the first measuring electrode pairs $M_1, M_1'$ and $M_2, M_2'$ could be measured. Likewise, the potential existing at a point between the second measuring pairs $M_3, M_3'$ and $M_4, M_4'$ or the potential of the remote electrode N could be utilized in some combination with the $M_0$ or $M_1$—$M_2$ potentials. In FIG. 10, there is shown apparatus for measuring the difference between the potentials of the measuring electrodes $M_0, M_0'$ and the potential at the point between the first measuring electrode pairs $M_1, M_1'$ and $M_2, M_2'$ to obtain a measure of the hatched line portion of the formation lying between the equipotential lines 112 and 113. To accomplish this, the measuring electrodes $M_0, M_0'$ and the center tap of the primary winding of the transformer 106 are connected across the primary winding 114 of a transformer 115, the secondary winding thereof being connected to the input of a measure amplifier 116. That portion of the output signal from measure amplifier 116 which is in-phase with the survey current $i_0$ is detected by a phase-sensitive detector 117 which supplies a signal proportional to the resistivity $R_{xo}$ of the invaded zone (i.e., hatched line zone in FIG. 10) to the surface of the earth.

To obtain a measure of the resistivity $R_t$ of the non-invaded zone of the formation, the center tap of the primary winding of transformer 106 and the remote reference electrode N are connected across the primary winding 118 of a transformer 119 so that a signal proportional to the difference in the potential of the reference electrode N and the potential at a point intermediate of the first measuring electrode pairs $M_1, M_1'$ and $M_2, M_2'$ will be supplied to a measure amplifier 120. That portion of the measured output signal from amplifier 120 which is in-phase with the survey current $i_0$ is detected by a phase-sensitive detector 121 which supplies a signal proportional to the resistivity $R_t$ of the non-invaded formation to the surface of the earth. This output signal is representative of the shaded portion of the formation lying between the equipotential line 113 which passes through a point between the measuring electrode pair $M_1, M_1'$ and $M_2, M_2'$ and the equipotential line 123 which passes through the remote reference electrode N.

The present invention could also be implemented by locating a plurality of electrodes on a pad which is adapted to enage the borehole wall. Referring to FIG. 11, there is shown a support member 125 supported in the borehole by a cable 134, which support member 125 carries two pad members 126 and 127 located on opposite sides of the support member 125. The lower 100 feet or so of cable 134 is covered with a suitable insulation material 135. Pad members 127 and 126 are adapted to be pushed outward and away from the central support member 125 toward the wall of the borehole. To accomplish this, as concerns the pad 126, suitable support arms 128, 129 and 130 are pivotally coupled between the pad member 126 and support member 125, the support arms being pivotally connected at points 131 and 132 by suitable hinging means. The lower end of the support arm 130 is pivotally coupled to a slidable collar member 133 to allow the pad member 126 to move in a direction perpendicular to the support member 125 when an actuating mechanism (not shown) within the support member 125 is energized. The pad member 127 is adapted to be pressed against the borehole wall in the same manner as is pad member 126.

Figure 13:
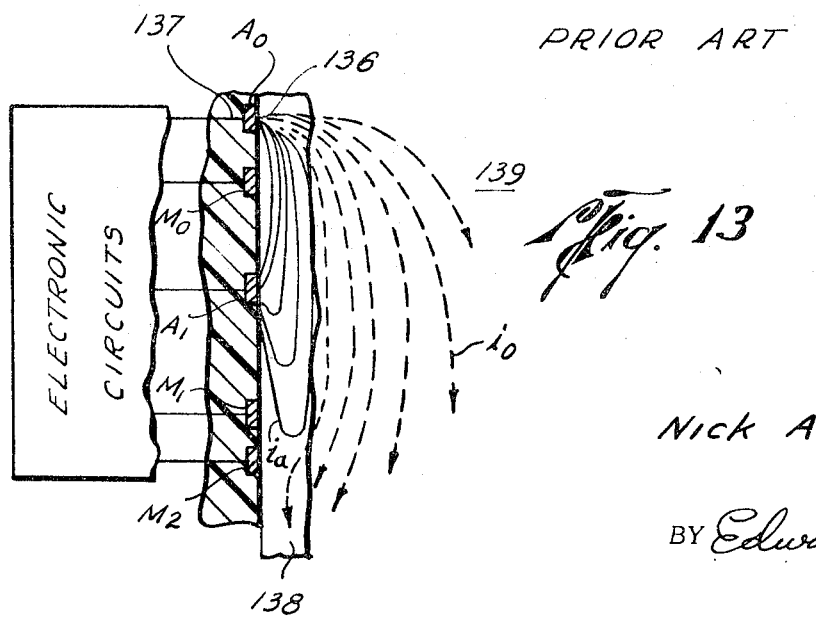
FIG. 13 illustrates the current flow pattern which could be expected with the FIGS. 12 and 14 electrode arrays.

Referring to FIG. 12, there is shown a typical example of an electrode array which forms part of the face of one of the pad members 126 or 127. The electrode array shown in FIG. 12 is a pad mounted version of the electrode array shown in FIG. 8. More particularly, a symmetrical electrode array comprising electrodes $M_0, M_0'$, $A_1, A_1'$, $M_1, M_1'$, $M_2$ and $M_2'$ are located above and below a central electrode $A_0$. Referring to FIG. 13, there is shown the lower half of the electrode array of FIG. 12 mounted on the pad member 126 which is pressed against a mudcake 138 for investigating a formation 139. The electrodes are located in cut-out portions 136 of an insulation material 137, the faces of the electrodes being recessed soemwhat below the outer face of the pad member to prevent spurious signals from being picked up by the electrodes as might otherwise result from their scraping against the borehole wall. Desirably, the same electronic circuits shown in FIG. 8 are connected to these electrodes of FIG. 13 for deriving indications of the electrical resistivity or conductivity of the formations.

The apparatus of FIGS. 12 and 13 operate in the same manner as the FIG. 8 apparatus but since the electrodes are pressed against the borehole wall, the mud column will not be a problem in this case as when the electrodes were mounted on the support member itself. However, as is many times the case with pad mounted electrode systems, the mudcake tends to short out the survey current in much the same manner as the mud column does with electrode arrays mounted on a central support member. Thus, as represented in FIG. 13 by the current flow lines, the auxiliary current $i_a$ passes primarily through the mudcake 138 thus forcing the survey current $i_0$ outward into the formation in much the same manner that the auxiliary current of FIG. 8 forced the survey current out of the mud column. By utilizing such a pad mounted eleectrode array, the depth of investigation can be considerably shallower than for a central support member mounted electrode array since the spacing between electrodes can now be shorter, the mud-cake thickness being considerably less than the borehole diameter.

When utilizing an electrode array of the type shown in FIG. 12, it is possible that much of the current emitted by the electrodes would tend to flow sideways around the pad rather than in a vertical direction, especially if the pad member tends to become removed from the wall of the borehole. To circumvent any problems of this type, an electrode array of the type shown in FIG. 14 could be utilized in place of the electrode array shown in FIG. 12. In this FIG. 14 electrode array, the central current-emitting electrode $A_0$ is concentrically surrounded by the $M_0$, $A_1$, $M_1$ and $M_2$ electrodes.

The electronic circuitry for energizing this FIG. 14 electrode array and the principle of operation thereof would be the same as discussed in connection with FIG. 13.

It should be apparent by now that the methods and apparatus of the present invention are beneficial whenever the investigating electrode array is in or near a medium which is more conductive than the medium under investigation. Although the electrode systems shown and described thus far are novel in and of themselves, the present invention could be utilized with prior art electrode systems to minimize this mud column problem. For example, referring to FIG. 15, there is shown a prior art electrode system of the type shown and described in the above-mentioned Doll Pat. No. 2,712,627. The electrode array of this Doll patent comprises a central current-emitting electrode $A_0$ surrounded on the upper and lower sides by a measuring electrode pair $M_1$, $M_1'$ and $M_2$, $M_2'$ and two current-emitting focusing electrodes $A_f$ and $A_f'$. Of course, there are suitable current return electrodes (not shown) located some distance from the electrodes shown in FIG. 15.

Figure 15:
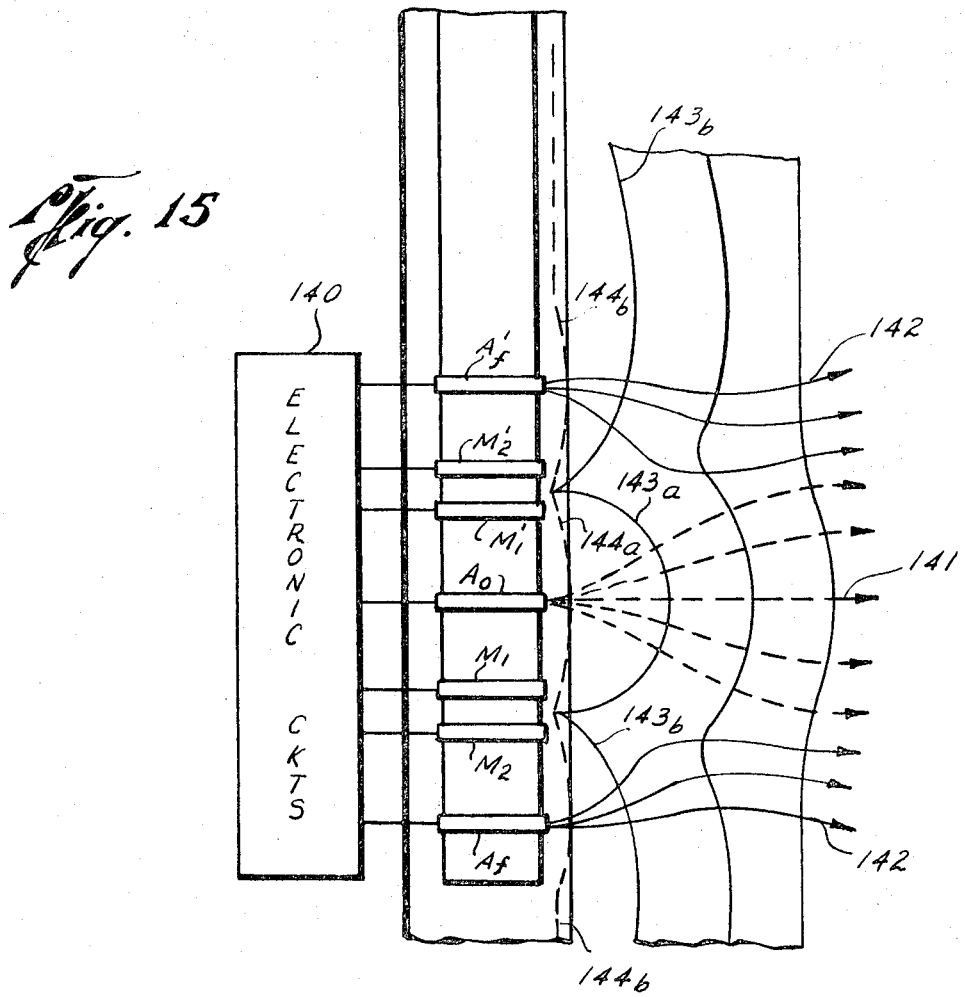
FIG. 15 illustrates a prior art focused electrode type investigating apparatus along with a typical plot of the equipotential lines and current flow pattern produced by such an electrode array.

The electronic circuitry 140 of FIG. 15 operates to supply survey current to the central electrode $A_0$ and monitor the potential gradient between the electrode pairs $M_1$, $M_1'$ and $M_2$, $M_2'$. Sufficient in-phase focusing current is supplied to the focusing electrodes $A_f$, $A_f'$ to maintain the potential gradient between the measuring electrode pairs at substantially zero volts. By so doing, the survey current 141 emanating from the survey electrode $A_0$ will be squeezed into a relatively thin sheet of current by the focusing current 142 emanating from the focusing electrodes $A_f$ and $A_f'$.

The potential difference between a potential existing at a point between the measuring electrodes $M_1$, $M_1'$ and $M_2$, $M_2'$ and a remote referenece electrode is then measured so that the resistivity of the formation laying between equipotential line 143a and infinity is measured. By so doing, a relatively deep investigation is obtained. However, when the mud column is highly conductive, the equipotential lines 143a -b will tend to take the shape represented by the dotted equipotential lines 144a-b so that a different portion of the formation is measured than is desired. The equipotential lines 144a-b, will, under certain conditions, be located close to the borehole thus rendering the exploring means responsive to the invaded zone resistivity. Another problem which may arise in the presence of a highly conductive mud column is that a large volume of the mud column on both sides of the electrode array will be at substantially the same potential as the focusing electrodes $A_f$ and $A_f'$ as represented by the equipotential line 144b. In this event, the survey current will tend to be overfocused.

Turning now to FIG. 16, there is shown apparatus constructed in accordance with the present invention for substantially minimizing this problem. In FIG. 16, a plurality of electrodes comprising three separate electrode arrays of the type shown in FIG. 8 are mounted on a central support member 145. The central electrode system comprises a central current-emitting electrode $A_{0s}$, a pair of measuring electrodes $M_{02}$ and $M_{02}'$ on either side thereof, and a pair of current return electrodes $A_{1s}$ and $A_{1s}'$ located adjacent to the measuring electrodes $M_{02}$ and $M_{02}'$. A pair of measuring electrodes $M_5$ and $M_6$ are located above the current return electrode $A_{1s}'$ and a pair of measuring electrodes $M_7$ and $M_8$ are located below the return electrode $A_{1s}$.

The upper and lower electrode systems are arranged in a similar manner. Thus, the upper electrode array comprises a central current-emitting electrode $A_{0f}'$ and, in the order of their spacing from the electrode $A_{0f}'$, a pair of measuring electrodes $M_{01}$ and $M_{01}'$, return electrodes $A_{1f}$ and $A_{1f}'$, a pair of upper measuring electrodes $M_1$ and $M_2$ and a pair of lower measuring electrodes $M_3$ and $M_4$. The lower electrode system comprises a central current-emitting electrode $A_{0f}$, and in the order of their spacing from this central electrode, a pair of measuring electrodes $M_{03}$ and $M_{03}'$, a pair of current return electrodes $A_{2f}$ and $A_{2f}'$, a pair of upper measuring electrodes $M_9$ and $M_{10}$ and a pair of lower measuring electrodes $M_{11}$ and $M$ .

The central current-emitting electrodes $A_{0s}$ of the central electrode system emits a survey current $i_{0s}$ for investigating adjacent earth formations, as well as an auxiliary current $i_{0a}$ for forcing the survey current $i_{0s}$ out of the borehole. To accomplish this, an oscillator 150 causes a constant magnitude of survey current $i_{0s}$ to be supplied between the central current-emitting electrode $A_{0s}$ and the armor of the multiconductor cable 31 via a transformer 151. A high gain amplifier 152 monitors the potential gradient between the measuring electrodes $M_6$, $M_7$ and $M_5$, $M_8$ via a transformer 153 and supplies a first auxiliary current $i_{0a}$ via a transformer 154 between the central current-emitting electrode $A_{0s}$ and the current return electrodes $A_{1s}$ and $A_{1s}'$. As before, this auxiliary current $i_{0a}$ is of sufficient magnitude to maintain the difference between the potentials of measuring electrodes $M_6$, $M_7$ and $M_5$, $M_8$ at substantially zero volts.

A high gain amplifier 155 monitors the potential gradient between the measuring electrodes $M_2$, $M_3$ and $M_1$, $M_4$ via a transformer 156 and supplies sufficient auxiliary current $i_{1a}$ via a transformer 157 between the central current-emitting electrode $A_{0f}'$ and the current return electrodes $A_{1f}$ and $A_{1f}'$ of the upper electrode system to maintain this potential gradient at substantially zero volts. Likewise, a high gain amplifier 158 monitors the potential gradient between the measuring electrodes $M_{10}$, $M_{11}$ and $M_9$, $M_{12}$ via a transformer 159 and supplies sufficient auxiliary current $i_{2a}$ via a transformer 160 between the central current-emitting electrodes $A_{0f}$ and the current return electrodes $A_{2f}$ and $A_{2f}'$ of the lower electrode system to maintain this potential gradient at substantially zero volts. Thus, it can be seen that the amplifiers 152, 155 and 158 and their associated feedback circuits operate to electrically plug the borehole at points intermediate of the central current-emitting electrode $A_{0s}$ and the lower and upper current-emitting electrodes $A_{0f}$ and $A_{0f}'$ as well as at the upper and lower extremities (i.e., at the locations defined by electrodes $M_1$-$M_2$ and $M_{11}$-$M_{12}$) of the electrode array mounted on the support member 145.

In addition to the above-mentioned plugging of the borehole, the FIG. 16 apparatus operates to maintain at least one electrode of each of the central, upper and lower electrode systems at substantially the same potential to produce a focusing effect similar to that shown in FIG. 15. In this connection, a high gain amplifier 161 monitors the potential difference between the measuring electrodes $M_{02}$, $M_{02}'$ of the central electrode system and the measuring electrodes $M_{03}$, $M_{03}'$ of the lower electrode system via a transformer 162 and supplies a sufficient amount of the lower electrode system current $i_{0f}$ via a transformer 163 between the lower current-emitting electrode $A_{0f}$ and the armor of the cable 31 to maintain the potential difference between the measuring electrodes $M_{02}$, $M_{02}'$ and $M_{03}$, $M_{03}'$ at substantially zero volts. Likewise, a high gain amplifier 164 monitors the potential difference between the measuring electrodes $M_{02}$ and $M_{02}'$ of the central electrode system and the measuring electrodes $M_{01}$ and $M_{01}'$ of the upper electrode system via a transformer 165 and supplies sufficient current via a transformer 166 between the current-emitting electrode $A_{0f}'$ of the upper electrode system and the armor of the cable 31 to maintain this potential difference substantially at zero volts.

To understand how the FIG. 16 apparatus produces the desired results, refer to the current flow diagram shown on the upper left side of the borehole in FIG. 16. The central current-emitting electrodes $A_{0a}$ and $A_{0f}'$ of the central and upper electrode systems emit auxiliary current $i_{0a}$ and $i_{1a}$ (the solid line current lines) which act to force the survey currents $i_{0s}$ and $i_{0f}'$ out of the borehole and into the formation. The magnitude of the survey current emitted from the central electrode $A_{0f}'$ of the upper electrode system is adjusted so that the potential difference between points on the central and upper electrode arrays is maintained substantially equal to zero. By this means, the survey current $i_{0f}'$ of the upper electrode system, in effect, acts as a focusing current for the survey current $i_{0s}$ emitted by the current-emitting electrode $A_{0s}$ of the central electrode array in the conventional manner (i.e., in the manner shown in FIG. 15). The central and lower electrode systems cooperate in a similar manner with the survey current $i_{0f}$ of the lower electrode system acting to focus the survey current $i_{0s}$ emitted from the electrode $A_{0s}$ of the central electrode system deeply into the formation.

Thus, it can be seen that the FIG. 16 apparatus utilizes three separate electrode systems of the type shown in FIG. 8 with the central current-emitting electrode of each electrode system emitting both auxiliary and survey current in the same manner as discussed in FIG. 8. By this means, the survey current emitted from the central current-emitting electrodes of each of the three electrode systems will be prevented from flowing through the borehole thus eliminating the problems discussed in connection with FIG. 15. Then, the control circuits comprising amplifiers 161 and 164 and their associated feedback connections act to adjust the magnitude of the survey currents $i_{0f}$ and $i_{0f}'$ emitted from the upper and lower electrode systems (which currents act as focusing currents) so as to maintain the potential at designated electrodes of all three electrode systems equal. By maintaining these three potentials equal, it is clear that the current flow of the three survey currents $i_{0s}$, $i_{0f}$ and $i_{0f}'$ in a longitudinal direction parallel to the borehole axis will be substantially zero so as to produce the desired deep focusing of the survey current $i_{0s}$.

The equipotential lines produced by the FIG. 16 investigating system are shown on the lower left side of the borehole in FIG. 16. Because of the action of the auxiliary currents $i_{0a}$, $i_{1a}$ and $i_{2a}$, these equipotential lines will tend to maintain the shape shown in FIG. 16 regardless of the conductivity of the mud column thus overcoming the problem represented in FIG. 15. Thus, to obtain a measure of the resistivity $R_t$ of the noninvaded formation zone, it is only necessary to measure the potential difference between the equipotential line 170 and a point located at infinity (i.e., a point at zero potential). To accomplish this, a measure amplifier 172 is responsive to the difference between the potential on the center tap of the primary winding of transformer 153 and the potential on the remote reference electrode N as developed across the primary winding 173 of a transformer 174. This measured potential difference is supplied to a phase-sensitive detector 175 which derives its phase reference signal from the oscillator 150. The output of the phase-sensitive detector 175 will be a varying DC signal proportional to the resitivity $R_t$ of the formation zone lying between the equipotential line 170a and infinity.

In addition to this $R_t$ measurement, it is also possible with the FIG. 16 apparatus to obtain a measurement of the invaded zone resistivity $R_{xo}$ by measuring the potential difference between the equipotential line 170 and an equipotential line 176 which passes through the measuring electrodes $M_{02}$ and $M_{02}'$. This potential difference will, in effect, produce a measurement of the hatched line formation zone lying between the equipotential lines 176 and 170. To provide this measure of $R_{xo}$, a measure amplifier 177 is responsive to the difference between the potential of the measuring electrodes $M_{02}$, $M_{02}'$ and the potential on the center tap of the primary winding of transformer 153 as developed across the primary winding 178 of a transformer 179. This measured potential difference is then applied to a phase-sensitive detector 180 which also derives its phase reference signal from the oscillator 150. The resulting output signal from phase-sensitive detector 180 will be a varying DC signal proportional to the invaded zone resistivity $R_{xo}$.

It should be pointed out in connection with this FIG. 16 embodiment that the utilization of three complete electrode systems represents the most elaborate embodiment of this form of the invention. By utilizing all three electrode systems, it is possible to maintain the equipotential lines 170a, 170b and 170c in a desired pattern. However, it would be possible to substitute the FIG. 8 type electrode system for only the central survey current electrode $A_0$ of FIG. 15 so as to maintain only the equipotential line 170a in the desired pattern. In this event, the equipotential line 170c (and the corresponding equipotential line on the upper side of the electrode array) would not necessarily take the form shown in FIG. 16 thus giving rise to a possible overfocusing effect, as discussed earlier. Or, perhaps, FIG. 8 type electrode systems (or any other electrode system constructed in accordance with the present invention) could be substituted for only the auxiliary electrodes $A_1$ and $A_1'$ of FIG. 15. Additionally, the adjoining measuring electrodes (i.e., $M_4$, $M_5$ and $M_8$, $M_9$) of each electrode system could be combined into one electrode and/or the upper and lower electrode systems could be shorted together with only one set of electronic circuitry to drive both electrode arrays, if desired.

It should be also be mentioned that a reciprocal arrangement of the earlier discussed embodiments could be implemented in accordance with the teachings of the present invention. To implement such a reciprocal arrangement, the functions of the current electrodes (emitting and return) and the measure electrodes are reversed. An example of how an electrode system can be reciprocated is set forth in U.S. Pat. No. 2,712,631 granted to M.C. Ferre on July 5, 1955.

Turning to FIG. 17, there is shown one example of how this reciprocal theory applies to the present invention. The FIG. 17 electrode array is ientical to that shown in FIG. 8 and the support member and electrodes of FIG. 17 have the same numerical designations as in FIG. 8. However, in FIG. 17, survey current $i_0$ is emitted from the $M_0$ and $M_0'$ electrodes and returned to the $M_2$ and $M_2'$ electrodes. The auxiliary current, on the other hand, is emitted from the $M_1$ and $M_1'$ electrodes and returned to the $M_2$ and $M_2'$ electrodes. The potential difference between the $A_0$ and $A_1$ electrodes is then measured and utilized to control the amount of auxiliary current flow. The survey current $i_0$ and the potential difference between the $A_0$ electrode and housing 77 are then measured to produce an indication of formation resistivity.

To accomplish this, an oscillator 190 supplies survey current $i_0$ between the $M_0$, $M_0'$ and $M_2$, $M_2'$ electrodes for emission into the surrounding formations. An $i_a$ amplifier 191 measures the potential difference between the $A_0$ and $A_1$, $A_1'$ electrodes via an input transformer 192 and supplies a sufficient amount of auxiliary current between the $M_1$, $M_1'$ and $M_2$, $M_2'$ electrodes via an output transformer 193 to maintain the measured potential difference substantially equal to zero. As seen on the left-hand side of the electrode array, the auxiliary current $i_a$ will operate to force the survey current $i_0$ out of the borehole and into the formations to enable a measure of the formation conductivity or resistivity to be obtained.

To obtain this measure of formation resitivity or conductivity, the primary winding 194 of a transformer 195 is positioned in series with the survey current-emitting electrodes $M_0$, $M_0'$ and the oscillator 190 to provide a signal indicative of this survey current $i_0$ to the input of a measure amplifier 196. As before, a phase-sensitive detector 197 compares this $i_0$ measure signal with a phase reference signal derived from the oscillator 190 and produces a DC output signal proportional to the in-phase component of this survey current $i_0$.

In the prior embodiments of this invention, it was assumed that either the survey current or a potential gradient was maintained constant. By so doing, it was only necessary to measure the other variable parameter to provide a measure of formation conductivity or resistivity. In this FIG. 17 embodiment, it is assumed that the oscillator 190 is not so regulated and thus both parameters may vary and must therefore be measured. Thus, a measure amplifier 198 is responsive to the potential difference between the $A_0$ electrode and either the housing 77 or cable armor, as developed across the secondary winding 199 of a transformer 200 for producing an output signal representative of this potential difference. This output signal is compared with a phase-reference signal from the oscillator 190 in a phase-sensitive detector 201 to produce a DC output signal proportional to this potential difference. This signal from detector 201 as well as the measured $i_0$ signal from detector 197 are combined in a ratio circuit which operates to produce a signal proportional to formation resistivity or conductivity for transmission to the surface of the earth.

It is to be understood that other earlier discussed embodiments of the present invention can be modified in this reciprocal manner. Moreover, while neither survey current nor voltage was controlled in this FIG. 17 embodiment, such control could readily be implemented in FIG. 15 in the same manner as discussed earlier.

It can thus be seen that the methods and apparatus of the present invention have solved the so-called "borehole effect" problem which is so troublesome to electrode type investigating systems. While a limited number of applications of the present invention have been shown, it is to be understood that the techniques of the present invention could be utilized in other situations than the ones shown here.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for measuring a characteristic of earth formations traversed by a borehole, comprising:
   a plurality of electrodes;
   carrying means for mounting said electrodes for passage through a borehole;
   means for supplying both survey and auxiliary currents to one and only one of said electrodes for emission into the media surrounding the carrying means, said survey current returning to a first return electrode for return to the current supplying means and said auxiliary current returning to at least two auxiliary current return electrodes located relatively near said current emission electrode for return to the current supplying means, one each of said auxiliary current return electrodes being located on each side of said current emission electrode;
   means for measuring the potential at a plurality of points along said mounting means; and
   means operative in response to the measured potentials for adjusting one of the survey or auxiliary currents to set up a given potential distribution in at least a portion of a borehole whereby the auxiliary current will tend to force the survey current into a formation to thereby obtain a measure of a formation charcteristic.

2. Apparatus for measuring a characteristic of earth formations traversed by a borehole, comprising:
   a plurality of electrodes;
   carrying means for mounting said electrodes for passage through a borehole;
   means for supplying both survey and auxiliary currents to one of said electrodes for emission into the media surrounding the carrying means where the survey current can return to a first return electrode for return to the current supplying means and where the auxiliary current can return to at least two auxiliary current return electrodes located relatively near said current emission electrode for return to the current supplying means, one each of said auxiliary current return electrodes being located on each side of said current emission electrode;
   means for measuring the potential at a plurality of points along said mounting means;
   means operative in response to the measured potentials for adjusting one of the survey or auxiliary currents to set up a given potential distribution in at least a portion of a borehole; and means for measuring the survey current being emitted from said current emission electrode to obtain a measure of a formation characteristic.

3. Apparatus for measuring a characteristic of earth formations traversed by a borehole, comprising:

a plurality of electrodes;

means for mounting electrodes for passage through a borehole, said electrodes including one current-emitting electrode for emitting survey and auxiliary currents into the media surrounding the mounting means, and a measuring electrode pair spaced apart from said one current-emitting electrode, a pair of return electrodes, one each located on either side of said one current-emitting electrode and one located between said one current-emitting electrode and said measuring electrode pair, a third return electrode located at a greater distance from said one current-emitting electrode than either electrode of the return electrode pair;

means for supplying all of said survey and auxiliary currents to said one current-emitting electrode, all of the auxiliary current returning to the return electrode pair for return to the current supplying means and the survey current returning to the third return electrode for return to the current supplying means; and means responsive to the potentials on said measuring electrodes for adjusting one of the auxiliary of survey currents to maintain a desired potential relationship between the potentials of said measuring electrode pair whereby said survey current will tend to be forced into a formation to thereby obtain a measure of a formation characteristic.

4. Apparatus for measuring a characteristic of earth formations traversed by a borehole, comprising:

a plurality of electrodes;

means for mounting said electrodes for passage through a borehole;

means for supplying survey and auxiliary currents to at least one of said electrodes for emission into the media surrounding the carrying means, said survey current returning to a first electrode for return to the current supplying means and said auxiliary current returning to a second electrode for return to the current supplying means; and means responsive to the potential gradient at two locations in a borehole for adjusting one of said survey or auxiliary currents to maintain a fixed relationship between said two potential gradients whereby said survey current will tend to be forced into a formation to thereby obtain a measure of a formation characteristic.

5. Apparatus for measuring a characteristic of earth formations traversed by a borehole, comprising:

a plurality of electrodes;

means for mounting said electrodes for passage through the borehole;

means for supplying survey and auxiliary currents to at least one of said electrodes for emission into the media surrounding the mounting means, said survey current returning to a first electrode for return to the current supply means and said auxiliary current returning to a second electrode for return to the current supply means; and means responsive to the potential gradient at two locations differently spaced from said current emission electrode in the borehole for adjusting one of said survey or auxiliary currents to maintain a fixed relationship between said two potential gradients whereby said survey current will tend to be forced into the formation to thereby obtain a measure of a formation characteristic.

6. Apparatus for measuring a characteristic of earth formations traversed by a borehole, comprising:

a plurality of electrodes;

means for mounting said electrodes for passage through a borehole;

means for supplying survey and auxiliary currents to at least one of said electrodes for emission into the media surrounding the mounting means, said survey current returning to a relatively remote electrode for return to the current supplying means and said auxiliary current returning to at least one electrode which is relatively near said at least one current-emitting electrode for return to the current supplying means;

means for measuring the potential gradient at two points in a borehole and generating a control signal representative of the relationship of the two gradients to one another; and means responsive to the control signal for adjusting one of said survey and auxiliary currents to maintain said control signal at a substantially constant level whereby said survey current will tend to be forced into a formation to thereby obtain a measure of a formation characteristic.

7. Apparatus for measuring a characteristic of earth formations traversed by a borehole comprising:

a plurality of electrodes;

means for mounting said electrodes for passage through the borehole;

means for supplying survey and auxiliary currents to at least one of said electrodes for emission into the media surrounding the mounting means, said survey current returning to a relatively remote electrode for return to the current supplying means and said auxiliary current returning to at least one electrode which is relatively near said at least one current-emitting electrode for return to the current supplying means;

means for measuring the potential gradient at two points differently spaced from said current emitting electrode in the borehole and generating a control signal representative of the relationship of the two gradients to one another; and means responsive to the control signal for adjusting one of said survey and auxiliary currents to maintain said control signal at a substanially constant level whereby said survey current will tend to be forced into a formation to thereby obtain a measure of a formation characteristic.

8. Apparatus for measuring a characteristic of earth formations traversed by a borehole, comprising:

a mounting means;

a plurality of electrodes mounted on said mounting means for passage through a borehole, said electrodes including at least one current-emitting electrode for emitting survey and auxiliary currents into the media surrounding the mounting means, a first return electrode located relatively near said at least one current-emitting electrode, a second return electrode located at a greater distance from said at least one current-emitting electrode than the first return electrode, and a plurality of measuring electrodes located at various distances from said at least one current-emitting electrode;

means for supplying survey and auxiliary currents to said at least one current-emitting electrode, the auxiliary current returning to the first electrode for return to the current supplying means and the survey current returning to the second electrode for return to the current supplying means; and means responsive to the potential on a plurality of the measuring electrodes for adjusting one of the auxiliary or survey currents to set up a potential distribution which decreases substantially as a function of $1/d$ where $d$ is the distance from said at least one current-emitting electrode, whereby the survey current will tend to be forced into a formation to thereby obtain a measure of a formation characteristic.

9. Apparatus for measuring a characteristic of earth formations traversed by a borehole, comprising:
a mounting means;
a plurality of electrodes mounted on said mounting means for passage through a borehole, said electrodes including at least one current-emitting electrode for emitting survey and auxiliary currents into the media surrounding the mounting means, a first return electrode located relatively near said at least one current-emitting electrode, a second return electrode located at a greater distance from said at least one current-emitting electrode than the first return electrode, and two measuring electrodes located at various distances from said at least one current-emitting electrode;

means for supplying survey and auxiliary currents to said at least one current-emitting electrode, the auxiliary current returning to the first electrode for return to the current supplying means and the survey current returning to the second electrode for return to the current supplying means; and means responsive to the potential on said two measuring electrodes for adjusting one of the auxiliary or survey currents to maintain the potential of one of the measuring electrodes substantially equal to $d_1/d_2$ of the potential on the other measuring electrode where $d_1$ and $d_2$ are the distance of said two measuring electrodes from said at least one current-emitting electrode, whereby the survey current will tend to be forced into a formation to thereby obtain a measure of a formation characteristic.

10. Apparatus for measuring a characteristic of earth formations traversed by a borehole, comprising:
a plurality of electrodes;
means for mounting said electrodes for passage through a borehole;
means for supplying survey and auxiliary currents to at least one of said electrodes for emission into the media surrounding the mounting means, said survey current returning to a first return electrode for return to the current supplying means and said auxiliary current returning to at least one electrode which is relatively near said at least one current emission electrode for return to the current supplying means; and means responsive to the potential gradient at a given location in the borehole for adjusting one of the survey or auxiliary currents to set up a potential distribution which decreases substantially as a function of $1/d$ where $d$ is the distance from said at least one current emission electrode, whereby the survey current will tend to be forced into a formation to thereby obtain a measure of a formation characteristic.

11. Apparatus for measuring a characteristic of earth formations traversed by a borehole, comprising:
a plurality of electrodes including at least one current-emitting electrode, a first return electrode located relatively near said at least one current-emitting electrode, a second return electrode located at a greater distance from said at least one current-emitting electrode than the first return electrode, and a plurality of measuring electrodes located at various distances from said at least one current-emitting electrode;

means for mounting said electrodes for passage through a borehole;

means for supplying a first current to said at least one current-emitting electrode, said first current returning to one of the return electrodes for return to the current supplying means;

means responsive to the potentials on a plurality of measuring electrodes for supplying a second current between said at least one current-emitting electrode and the other of said return electrodes to set up a potential distribution which decreases substantially as a function of $1/d$ where $d$ is the distance from said at least one current-emitting electrode; and means responsive to the potentials on a plurality of said electrodes for obtaining a measure of a formation characteristic.

12. Apparatus for measuring a characteristic of earth formations traversed by a borehole, comprising:
a plurality of electrodes;
means, including a borehole wall-engaging pad member, for mounting said electrodes for passage through a borehole, said electrodes including at least one pad mounted current-emitting electrode, a first pad mounted return electrode concentrically surrounding said at least one current-emitting electrode, a pair of pad mounted measuring electrodes concentrically surrounding said first return electrode, a second return electrode located at a greater distance from said at least one current-emitting electrode than said first return electrode;

means for supplying survey and auxiliary currents to said at least one current-emitting electrode, the auxiliary current returning to the first electrode for return to the current supplying means and the survey current returning to the second electrode for return to the current supplying means; and means responsive to the potentials of the measuring electrodes for adjusting one of the survey or auxiliary currents to maintain a given potential difference between said two measuring electrodes whereby said survey current will tend to be forced into a formation to thereby obtain a measure of a formation characteristic.

13. Apparatus for measuring a characteristic of earth formations traversed by a borehole, comprising:
a plurality of electrodes;

means, including a borehole wall-engaging pad member, for mounting said electrodes for passage through a borehole, said electrodes including at least one central pad mounted current-emitting electrode, a first pad mounted return electrode concentrically surrounding said at least one current-emitting electrode, a pair of pad mounted measuring electrodes concentrically surrounding said first return electrode, a second return electrode located at a greater distance from said at least one current-emitting electrode than said first return electrode;

means for supplying survey and auxiliary currents to said central current-emitting electrode, the auxiliary current returning to the first electrode for return to the current supplying means and the survey current returning to the second electrode for return to the current supplying means;

means responsive to the potentials of the measuring electrodes for adjusting one of the survey or auxiliary currents to maintain a given potential difference between said two measuring electrodes; and means for measuring said survey current to obtain a measure of a formation characteristic.

14. Apparatus for measuring a characteristic of earth formations traversed by a borehole, comprising:

a plurality of potential and current electrodes including electrodes for emitting survey and auxilary currents in a localized region of a borehole, at least one current return electrode spaced apart from said region, and electrodes for measuring potentials at two points differently spaced on either side of said region;

support means for movement of said electrodes in spaced relation through a borehole;

means for passing all of said survey current and at least part of said auxiliary current between a current electrode in said region and at least one electrode outside of said region;

means responsive to the potential difference measured between said two points for varying one of the auxiliary current or survey current to maintain said potential difference substantially at a selected value; and means responsive to the electric field proximate to said region for providing a measure of a formation characteristic.

15. In a system for investigating earth formations traversed by a borehole, apparatus for establishing a given potential distribution comprising:

a plurality of electrodes;

means for mounting said electrodes for passage through a borehole;

means for supplying first and second currents to at least one of said electrodes for emission into the media surrounding the mounting means, said first current returning to a first return electrode for return to the current supplying means and said second current returning to at least one electrode which is relatively near said current emission electrodes for return to the current supplying means; and means responsive to the potentials at a plurality of points in a borehole for adjusting one of said first or second currents to establish a potential distribution which descreases as a function of $1/d$ where $d$ is the distance from said at least one current-emitting electrode.

16. In a system for investigating earth formations traversed by a borehole, apparatus for forcing current into a formation comprising:

a plurality of electrodes;

means for mounting said electrodes for passage through a borehole;

means for supplying first and second currents to at least one of said electrodes for emission into the media surrounding the mounting means, said first current returning to a first electrode for return to the current supplying means and said second current returning to a second electrode for return to the current supplying means; and means responsive to the potential gradient at two locations in a borehole for adjusting one of said first or second currents to maintain a fixed relationship between said two potential gradients whereby said first current will tend to be forced into a formation.

17. In a system for investigating earth formations traversed by a borehole, apparatus for forcing current into a formation, comprising:

a plurality of electrodes;

means for mounting said electrodes for passage through the borehole;

means for supplying first and second currents to at least one of said electrodes for emission into the media surrounding the mounting means, said first current returning to a first electrode for return to the current supply means, and said second current returning to a second electrode for return to the current supply means; and means responsive to the potential gradient at two locations differently spaced from said current supply electrode in the borehole for adjusting one of said first or second currents to maintain a fixed relationship between said two potential gradients whereby said first current will tend to be forced into a formation.

18. A method of measuring a characteristic of earth formations traversed by a borehole, comprising:

moving a plurality of electrodes through a borehole;

supplying survey current between one current-emitting electrode and a first return electrode;

measuring the potential distribution at borehole locations on opposite sides of said one current-emitting electrode;

supplying auxiliary current between said one current-emitting electrode and two other electrodes of which one each is located between said one current-emitting electrode and each of said potential measuring locations, in response to said measured potential distribution; and measuring said survey current to obtain an indication of a formation characteristic.

19. A method of measuring a characteristic of earth formations traversed by a borehole, comprising:

moving a plurality of electrodes through a borehole;

supplying survey and auxiliary currents to at least one of said electrodes for emission into the media surrounding the electrodes, said survey current returning to a first return electrode for return to the current supplying means and said auxiliary current returning to at least one electrode which is relatively near said at least one current emission electrode for return to the current supplying means;

measuring the potential at various points through a borehole; and adjusting one of the survey or auxiliary currents in response to the measured potentials to set up a potential distribution which descreases approximately as a function of $1d$ where $d$ is the distance from said at least one current-emitting electrode, whereby said survey current will tend to be forced into a formation to thereby obtain a measure of a formation characteristic.

20. A method of measuring a characteristic of earth formations traversed by a borehole, comprising:

moving a plurality of electrodes through a borehole;

supplying survey and auxiliary currents to at least one of said electrodes for emission into the media surrounding the electrodes, said survey current returning to a first return electrode for return to the current supplying means and said auxiliary current returning to at least one electrode which is relatively near said at least one current emission electrode for return to the current supplying means;

measuring the difference difference in potential between two points in a borehole to produce a first output signal;

measuring the difference in potential between two other points in a borehole to produce a second output signal; and adjusting one of said survey or auxiliary currents in response to said first and second output signals to maintain a given relationship between said first and second output signals whereby said survey current will be forced into a formation to thereby obtain a measure of a formation characteristic.

21. A method of measuring a characteristic of earth formations taversed by a borehole, comprising:

moving a plurality of electrodes through the borehole;

supplying survey and auxiliary current to at least one of said electrodes for emission into the media surrounding the electrodes, said survey current returning to a first return electrode for return to the current supplying means and said auxiliary current returning to at least one electrode which is relatively near said at least one current emission electrode for return to the current supplying means;

measuring the difference in potential between two points in the borehole to produce a first output signal;

measuring the difference in potential between two other points differently spaced from said current emission electrode then said first measured potential difference points in the borehole to produce a second output signal; and adjusting one of said survey or auxiliary currents in response to said first and second output signal to maintain a given relationship between said first and second output signal whereby said survey current will be forced into a formation to thereby obtain a measure of a formation characteristic.

22. A method of measuring a characteristic of earth formations traversed by a borehole, comprising:

moving a plurality of electrodes through a borehole;

supplying survey and auxiliary currents to at least one of said electrodes for emission into the media surrounding the electrodes, said survey current returning to a first return electrode for return to the current supplying means and said auxiliary current returning to at least one electrode which is relatively near said at least one current emission electrode for return to the current supplying means;

measuring the difference in potential between two points in a borehole; and adjusting one of said survey or ayxilliary currents in response to said potential difference to maintain the potential at one of said points substantially equal to $d_1/d_2$ of the potential at the other of said points where $d_1$ and $d_2$ are the distances of said two points from said at least one current-emitting electrode whereby said survey current will tend to be forced into a formation to thereby obtain a measure of a formation characteristic.

23. A method of measuring a characteristic of earth formations traversed by a borehole, comprising:

moving a plurality of potential and current electrodes through a borehole, said electrodes including electrodes for emitting survey and auxiliary currents in a localized region of a borehole, at least one current return electrode spaced apart from said region, and electrodes for measuring potentials at two points differently spaced on either side of said region;

passing all of said survey current and at least part of said auxliary current between a current electrode in said region and at least one electrode outside of said region;

varying one of the auxiliary current or survey current in response to the potential difference measured between said two points to maintain said potential difference substantially at a selected value; and deriving a measure of a formation characteristic in response to the electric field proximate to said region.

24. A method of measuring a characteristic of earth formations traversed by a borehole, comprising:

moving a plurality of potential and current electrodes through a borehole, said electrodes including electrodes for emitting survey and auxiliary currents in a localized region of a borehole, at least one current return electrode spaced apart from said region, and electrodes for measuring a first potential difference at two points differently spaced on either side of said region and for measuring a second potential difference between two points located outside of said region;

passing all of said survey current and at least part of said auxiliary current between a current electrode in said region and at least one electrode outside of said region;

varying one of the auxiliary current or survey current in response to said first potential difference measured between said two differentially spaced points to maintain said first potential difference substantially at a selected value;

varying the other of said survey or auxiliary currents in response to said second potential difference measured outside of said region; and providing a measure of a formation characteristic in response to said survey current.

25. A method of measuring a characteristic of earth formations traversed by a borehole, comprising:

moving a plurality of potential and current electrodes through a borehole, said electrodes including electrodes for emitting survey and auxiliary currents in a localized region of a borehole, at least one current return electrode spaced apart from said region, and electrodes for measuring potentials at two points differently spaced on either side of said region;

passing all of said survey current and at least part of said auxiliary current between a current electrode in said region and at least one electrode outside of said region;

varying one of the auxiliary current or survey current in response to the potential difference measured between said two points to establish a potential field near said region which varies substantially inversely as a function of distance from said region; and deriving a measure of a formation characteristic in response to the electric field proximate to said region.

26. In a system for investigating earth formations traversed by a borehole, apparatus for forcing current into a formation comprising:

a plurality of electrodes;

means for mounting said electrodes for passage through a borehole, said electrodes incuding a current-emitting electrode for emitting first and second currents into a media surrounding the mounting means, a measuring electrode pair spaced apart from said at least one current-emitting electrode, a pair of return electrodes having one each located on either side of said at least one current-emitting electrode and one of said return electrodes located between said at least one current-emitting electrode and said measuring electrode pair, a third return electrode located at a greater distance from said at least one current-emitting electrode than either electrode of the return electrode pair;

means for supplying all of said first and second currents to said current-emitting electrode, all of the second current returning to the return electrode pair for return to the current supplying means and the first current returning to the third return electrode for return to the current supplying means; and means responsive to the potential of said measuring electrodes for adjusting one of the first or second currents to maintain a desired potential relationship between the potentials of said measuring electrode pair whereby said first current will tend to be forced into a formation.

27. Apparatus for measuring a characteristic of earth formations traversed by a borehole, comprising:

a plurality of electrodes;

means for mounting said electrodes for passage through a borehole, said electrodes including at least one current-emitting electrode for emitting survey and auxiliary currents into the media surrounding the mounting means, two pairs of measuring electrodes located one each on each side of said at least one current-emitting electrode, a current return electrode pair having one electrode each located between said at least one current-emitting electrode and each of said measuring electrode pairs, and a third current return electrode spaced apart from said other electrodes;

means for supplying all of the survey and auxiliary currents to said at least one current-emitting electrode for emission into the media surrounding the mounting means, said survey current returning to said third current return electrode for return to the current supplying means and said auxiliary current returning to said current return electrode pair for return to the current supplying means; and means responsive to the potentials on said measuring electrodes for adjusting one of said survey or auxiliary currents to maintain a given potential distribution in the vicinity of said measuring electrodes whereby said survey current will tend to be forced into a formation to thereby obtain a measure of a formation characteristic.

28. In a system for investigating earth formation traversed by a borehole, apparatus for forcing current into a formation, comprising:

a plurality of electrodes;

means for mounting sai electrodes for passage through a borehole;

means for supplying first and second currents to at least one of said electrodes for emission into the media surrounding the mounting means, said first current returning to a first return electrode for return to the current supplying means and said second current returning to at least one electrode which is relatively near said at least one current emission electrode for return to the current supplying means;

means for measuring the difference between the potentials at two points in a borehole and generating a first output signal representative of said potential difference;

means for measuring the difference between the potential existing at a point in the vicinity of said two points and a remote point and generating a second output signal representative thereof; and means responsive to the ratio of said first signal to said second signal for adjusting one of said first or second currents to maintain a given potential gradient in the vicinity of said two borehole points whereby said first current will tend to be forced into a formation.

29. In a system for investigating earth formations traversed by a borehole, apparatus for forcing current into a formation comprising:

a plurality of electrodes including at least one current-emitting electrode, a first pair of measuring electrodes, a first return electrode located between said at least one current-emitting electrode and said first pair of measuring electrodes, a second pair of measuring electrodes, a second current-emitting electrode located between said first and second pairs of measuring electrodes, and a second current return electrode located between said second current-emitting electrode and said second pair of measuring electrodes;

means for mounting said electrodes for passage through a borehole;

means for supplying a first current to said at least one current-emitting electrode for emission into the media surrounding said mounting means;

means responsive to the potentials on said first pair of measuring electrodes for supplying a first auxiliary current between said at least one current-emitting electrode and said first return electrode of sufficient magnitude to maintain a given potential relationship between the electrodes of said first measuring electrode pairs; and means responsive to the potentials on said second pair of measuring electrodes for supplying a second auxiliary current between said second current-emitting electrode and said second current return electrode of sufficient magnitude to maintain a given relationship between the potentials of said second measuring electrode pair whereby said first current will be forced into a formation.

30. Apparatus for measuring a characteristic of earth formations traversed by a borehole, comprising:

a plurality of electrodes;

means for mounting said electrodes for passage through a borehole, said electrodes inlcuding one current-emitting electrode for emitting survey and auxiliary currents into the media surrounding the mounting means, two pair of measuring electrodes located one each on each side of said current-emitting electrode, a current return electrode pair having one electrode each located between said current-emitting electrode and each of said measuring electrode pairs, a pair of measuring electrodes located one each between said current emitting electrode and each of said electrodes of said current return electrode pair, and a third current return electrode spaced apart from said other electrodes;

means for supplying all of the survey and auxiliary currents to said current-emitting electrode for emission into the media surrounding the mounting means, said survey current returning to said third current return electrode for return to the current supplying means and said auxiliary current returning to said current return electrode pair for return to the current supplying means; and means responsive to the potentials on said measuring electrodes for adjusting one of said survey or auxiliary currents to maintain a given potential distribution in the vicinity of said two pair of measuring electrodes and obtaining an indication of a formation characteristic.

31. Apparatus for measuring a characteristic of earth formations traversed by a borehole, comprising:

a plurality of electrodes;

means for mounting said electrodes for passage through a borehole, said electrodes including at least one current-emitting electrode for emitting survey and auxiliary currents into the media surrounding the mounting means, two pair of measuring electrodes located one each on each side of said at least one current-emitting electrode, a current return electrode pair hving one electrode each located between said at least one current-emitting electrode and each of said measuring electrode piars, one pair of measuring electrodes located one each between said current emitting electrode and each of said electrodes of said current return electrode pair, and a third current return electrode spaced apart from said other electrodes;

means for supplying all of the survey and auxiliary currents to said at least one current-emitting electrode for emission into the media surrounding the mounting means, said survey current returning to said third current return electrode for return to the current supplying means and said auxiliary current returning to said current return electrode pair for return to the current supplying means;

means responsive to the potentials on said two pair of measuring electrodes for adjusting one of said survey or auxiliary currents to maintain a given potential distribution in the vicinity of said measuring electrodes whereby said survey current will tend to be forced into a formation; and means responsive to the potentials on said one pair of measuring electrodes for obtaining an indication of formation conductivity or resistivity.

32. Apparatus for measuring a characteristic of earth formations traversed by a borehole, comprising:

a plurality of electrodes;

means, including a borehole wall-engaging pad member, for mounting said electrodes for passage through a borehole, said electrodes including one centrally located pad mounted current-emitting electrode, a first pad mounted measure electrode concentrically surrounding said current emitting electrode, a first pad mounted return electrode concentrically surrounding first measured electrode, second and third pad mounted measuring electrodes conecentrally surrounding said first return electrode, a second return eelctrode located at a greater distance from said at least one current-emitting electrode than said first return electrode;

means for supplying survey and auxiliary currents to said current-emitting electrode, the auxiliary current returning to the first return electrode for return to the current supplying means and the survey current returning to the second return electrode for return to the current supplying means; and means responsive to the potentials of the measuring electrodes for adjusting one of the survey or auxiliary currents to maintain a given potential difference between said second and third measuring electrodes and obtaining a measure of a formation characteristic.

33. Apparatus for measuring a characteristic of earth formations traversed by a borehole, comprising:

a plurality of electrodes;

means, including a borehole wall-engaging pad member, for mounting said electrodes for passage through a borehole, said electrodes including one centrally located pad mounted current-emitting electrode, a first pad mounted measure electrode concentrically surrounding said current emitting electrode, a first pad mounted return electrode concentrically surrounding first measure electrode, second and third pad mounted measuring electrodes concentrically surrounding said first return electrode, a second return electrode located at a greater distance from said at least one current-emitting electrode than said first return electrode;

means for supplying survey and auxiliary currents to said current-emitting electrode, the auxiliary current returning to the first return electrode for return to the current supplying means and the survey current returning to the second return electrode for return to the current supplying means; and means responsive to the potentials of the second and third measuring electrodes for adjusting one of the survey or auxiliary currents to maintain a given potential difference between said second and third measuring electrodes whreby said survey current will tend to be forced into a formation;

means responsive to the potential on said first measure electrode for obtaining a measure of formation conductivity or resistivity.

34. Apparatus for investigating earth formations traversed by a borehole, comprising:

a support means for carrying a plurality of electrodes and adapted for movement through a borehole, the electrodes include a current-emitting electrode array having at least a central current-emitting electrode, two pairs of potential monitoring electrodes, one each located on opposite sides of said central electrode, and an auxiliary electrode located between said central current-emitting electrode and each of said monitoring elecrode pairs;

means for supplying survey current to said central current-emitting electrode for obtaining a measure of a formation characteristic, all of said survey current being emitted from said central electrode;

means for measuring the potential difference between the potentials on said potential monitoring electrodes; and means responsive to said measured potential difference for supplying current between at least one of said current-emitting electrodes and said auxiliary electrodes to maintain said potential difference at a substantially fixed value.

* * * * *